US008839359B2

(12) United States Patent
Ito et al.

(10) Patent No.: US 8,839,359 B2
(45) Date of Patent: Sep. 16, 2014

(54) DATA PROCESSING DEVICE AND DATA PROCESSING METHOD

(75) Inventors: Akio Ito, Yokohama (JP); Nobuhiro Tagashira, Nagareyama (JP)

(73) Assignee: Canon Kabushiki Kaisha, Tokyo (JP)

(*) Notice: Subject to any disclaimer, the term of this patent is extended or adjusted under 35 U.S.C. 154(b) by 1 day.

(21) Appl. No.: 13/235,905

(22) Filed: Sep. 19, 2011

(65) Prior Publication Data

US 2012/0008770 A1  Jan. 12, 2012

Related U.S. Application Data

(63) Continuation of application No. 11/678,192, filed on Feb. 23, 2007.

(30) Foreign Application Priority Data

Feb. 24, 2006  (JP) ................................ 2006-048943

(51) Int. Cl.
*H04L 29/00* (2006.01)
*G06F 21/80* (2013.01)

(52) U.S. Cl.
CPC ........ *G06F 21/80* (2013.01); *G06F 2221/2107* (2013.01); *G06F 2221/2103* (2013.01)
USPC .............. 726/2; 713/153; 713/189; 713/192; 713/193; 726/16; 726/21; 726/26; 726/27

(58) Field of Classification Search
USPC .......... 713/153, 189, 192, 193; 726/2, 16, 21, 726/26, 27
See application file for complete search history.

(56) References Cited

U.S. PATENT DOCUMENTS

| 7,549,044 | B2 * | 6/2009 | Lee et al. .................... 713/167 |
| 8,526,615 | B2 * | 9/2013 | Fujimoto et al. .............. 380/255 |
| 2003/0126362 | A1 * | 7/2003 | Camble et al. ................ 711/114 |
| 2003/0140239 | A1 | 7/2003 | Kuroiwa et al. |

(Continued)

FOREIGN PATENT DOCUMENTS

| WO | 02/37239 A2 | 5/2002 |
| WO | WO 2005029272 A2 * | 3/2005 |

OTHER PUBLICATIONS

International Standard, "Information technology—Security techniques—Entity authentication—Part 2: Mechanisms using symmetric encipherment algorithms", (1994), ISO/IEC 9798-2, XP000672407, 11 pages.

*Primary Examiner* — Brandon Hoffman
*Assistant Examiner* — Michael D Anderson
(74) *Attorney, Agent, or Firm* — Canon U.S.A., Inc. IP Division

(57) ABSTRACT

A data encryption device is connected between an HDD and an HDD controller that controls the HDD. The data encryption device encrypts data that is stored from the HDD controller to the HDD, and decrypts data that is read from the HDD. A CPU of the data encryption device receives a command issued from the HDD controller to the HDD, and determines whether the command is executable at the HDD. When it is determined that the command is executable, the command is issued to the HDD. On the other hand, when it is determined that the command is unexecutable, the CPU prohibits issuance of the command to the HDD. Furthermore, when a command issued to the HDD is a specific command, the CPU bypasses data transferred between the HDD controller and the HDD without encryption or decryption.

12 Claims, 16 Drawing Sheets

(56) References Cited

U.S. PATENT DOCUMENTS

| | | | |
|---|---|---|---|
| 2003/0235310 A1* | 12/2003 | Saito et al. | 380/281 |
| 2004/0008846 A1* | 1/2004 | Medvinsky | 380/278 |
| 2007/0300287 A1* | 12/2007 | Wynne et al. | 726/2 |
| 2008/0065905 A1* | 3/2008 | Salessi | 713/193 |

* cited by examiner

FIG. 8

| COMMAND NAME | TYPE |
|---|---|
| GET STATUS | Non DATA |
| INSTALL | WRITE |
| VERSION INFORMATION | READ |
| CHANGE NORMAL | Non DATA |
| CHANGE INTERCEPT | Non DATA |
| ⋮ | ⋮ |
| SEND CHA1 | WRITE |
| REQUEST RES1 | READ |
| REQUEST CHA2 | READ |
| SEND RES2 | WRITE |

| COMMAND NAME | TYPE |
|---|---|
| RECALIBRATE | Non DATA |
| SEEK | Non DATA |
| EXECUTIVE DEVICE DIAGNOSTIC | Non DATA |
| ⋮ | ⋮ |
| READ DMA | DMA |
| WRITE DMA | DMA |
| ⋮ | ⋮ |
| FLUSH CACHE | Non DATA |
| IDENTIFY DEVICE | PIO READ |
| SET FEATURES | Non DATA |

1101, 1102

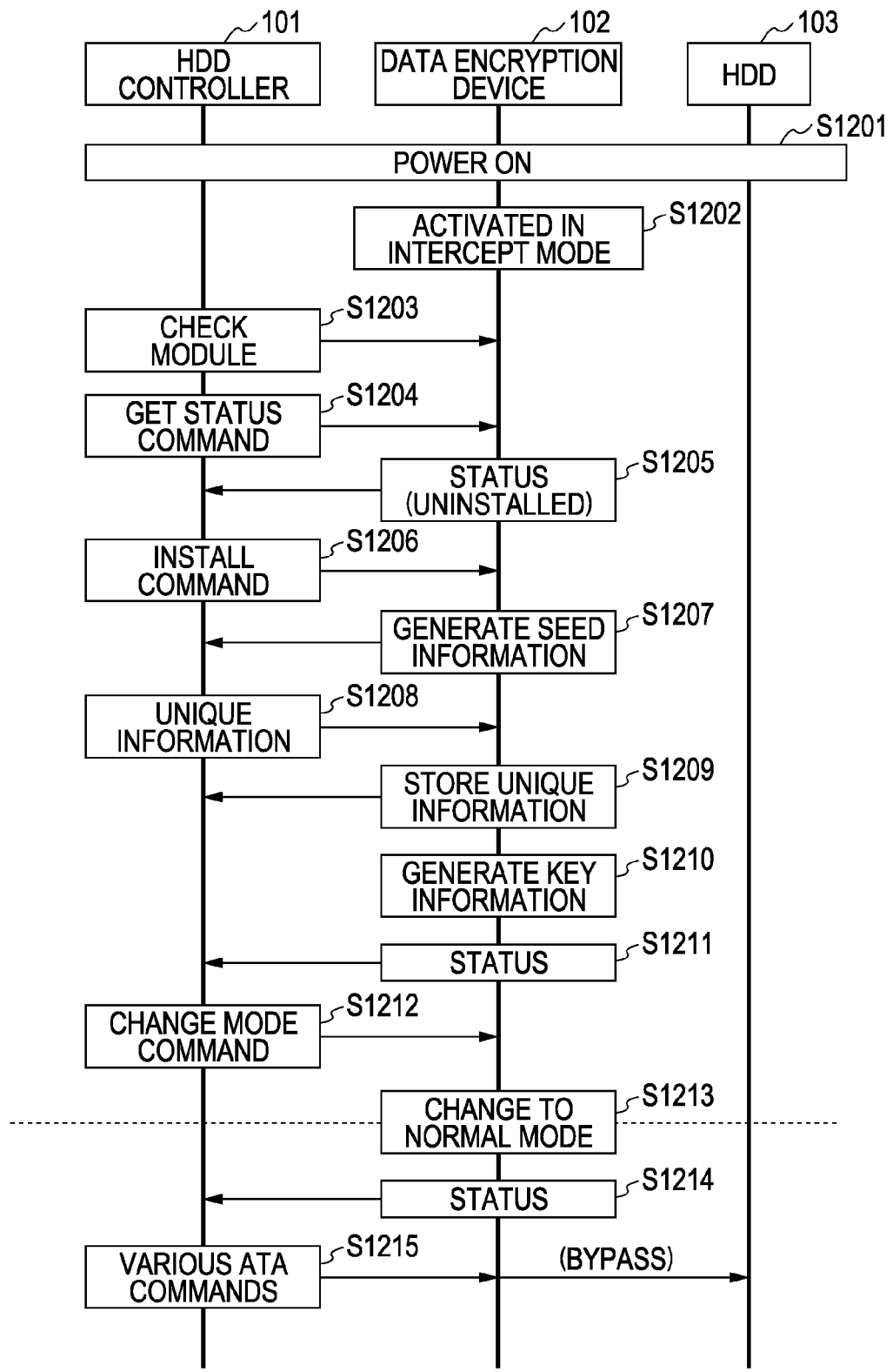

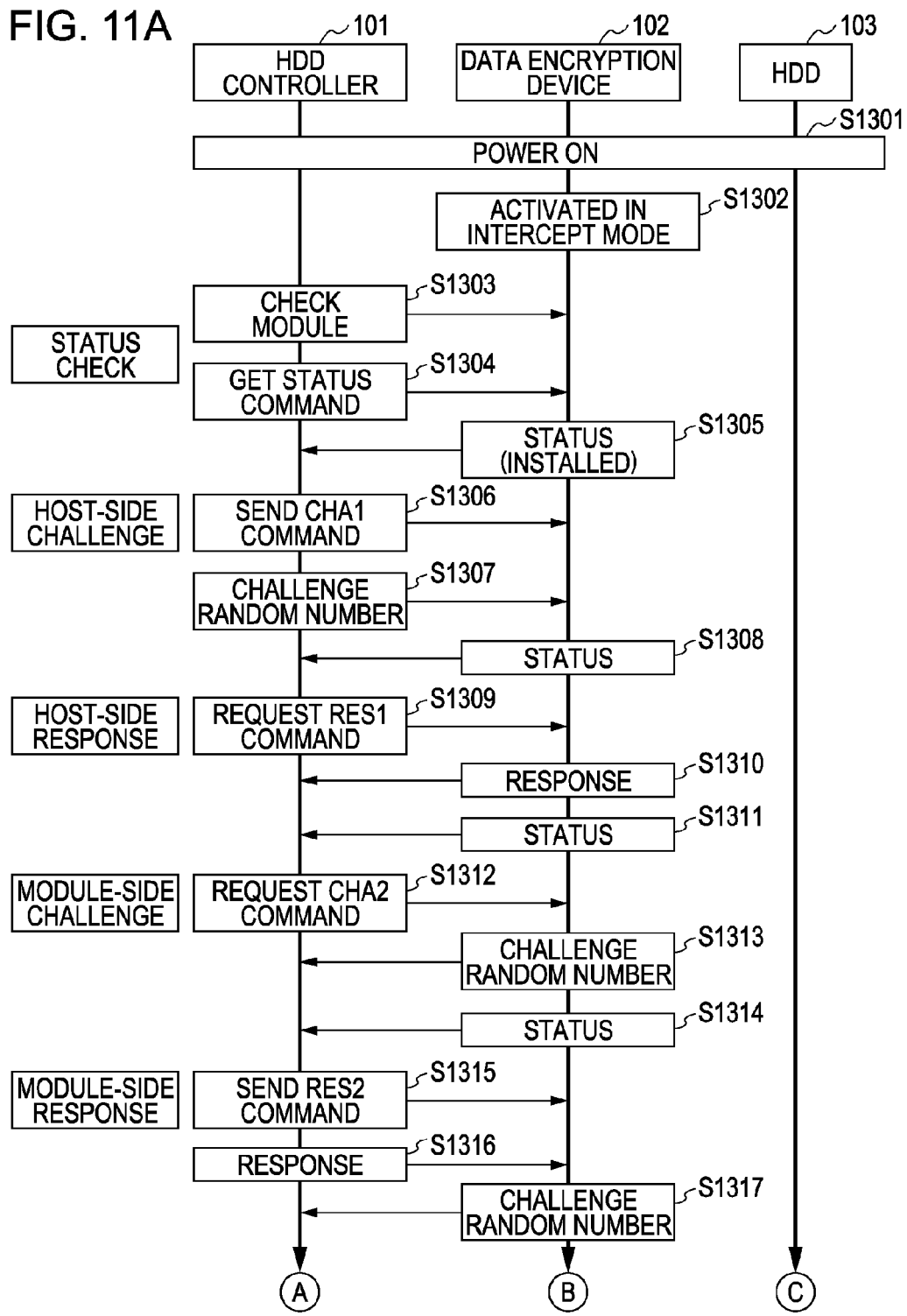

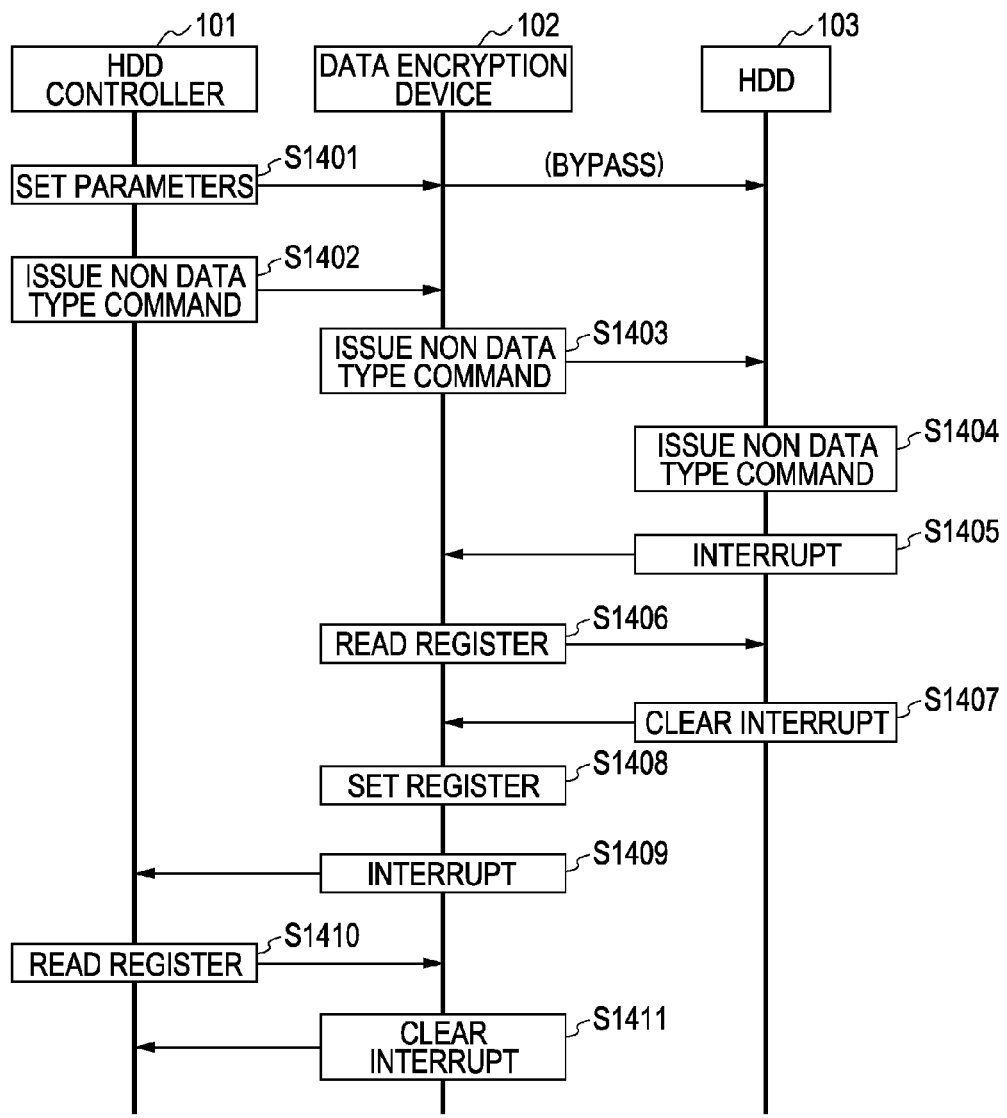

FIG. 16

| DIRECTORY INFORMATION |
| --- |
| FIRST DATA PROCESSING PROGRAM PROGRAM CODE CORRESPONDING TO STEPS OF FLOWCHART SHOWN IN FIG. 2 |
| SECOND DATA PROCESSING PROGRAM PROGRAM CODE CORRESPONDING TO STEPS OF FLOWCHART SHOWN IN FIG. 10 |
| THIRD DATA PROCESSING PROGRAM PROGRAM CODE CORRESPONDING TO STEPS OF FLOWCHARTS SHOWN IN FIGS. 11A AND 11B |
| FOURTH DATA PROCESSING PROGRAM PROGRAM CODE CORRESPONDING TO STEPS OF FLOWCHART SHOWN IN FIG. 12 |
| FIFTH DATA PROCESSING PROGRAM PROGRAM CODE CORRESPONDING TO STEPS OF FLOWCHART SHOWN IN FIG. 13 |
| SIXTH DATA PROCESSING PROGRAM PROGRAM CODE CORRESPONDING TO STEPS OF FLOWCHART SHOWN IN FIG. 14 |
| SEVENTH DATA PROCESSING PROGRAM PROGRAM CODE CORRESPONDING TO STEPS OF FLOWCHART SHOWN IN FIG. 15 |

DATA PROCESSING DEVICE AND DATA PROCESSING METHOD

CROSS REFERENCE TO RELATED APPLICATIONS

This application is a continuation of application Ser. No. 11/678,192, filed on Feb. 23, 2007, which claims the benefit of Japanese Application No. 2006-048943 filed Feb. 24, 2006, the entirety of which are incorporated herein by reference.

BACKGROUND OF THE INVENTION

1. Field of the Invention

The present invention relates to data processing devices and data processing methods.

2. Description of the Related Art

In computer systems, data is often stored in external storage devices. An external storage device, such as a hard disk drive (HDD), is connected to a computer system via a cable (e.g., an IDE cable, a SCSI cable, a USB cable, or an IEEE 1395 cable) or the like, so that the external storage device is not physically integrated with the computer system and can be separated from the computer system. Thus, if the external storage device is separated from the computer system and is analyzed, data stored in the external storage device can be leaked.

A countermeasure against this threat is encryption of data that is stored in an external storage device. More specifically, data that is written to an external storage device is encrypted and data that is read from the external storage device is decrypted, thereby preventing leakage of data stored in the external storage device.

There exist three approaches for newly adding an encryption and decryption function to an existing computer system.

A first approach is to add an encryption and decryption function within a computer system. According to this approach, however, since an encryption and decryption function is added within an existing computer system, the configuration of the computer system must be changed considerably.

A second approach is to add an encryption and decryption function to an external storage device. According to this approach, however, since an encryption and decryption function is added to an external storage device, it is not possible to use general external storage devices.

A third approach is to newly provide a device that bridges between a computer system and an external storage device. Techniques relating to the third approach are proposed, for example, in Japanese Patent Laid-Open No. 4-98552 and Japanese Patent Laid-Open No. 11-85621.

According to Japanese Patent Laid-Open No. 4-98552, an electronic filing device including encrypting means, decrypting means, and data processing means, the electronic filing device encrypts data that is recorded on an external storage device and decrypts data that is read from the external storage device. Furthermore, information needed for encryption or decryption can be separated.

Japanese Patent Laid-Open No. 11-85621 discloses a recording-data encryption device connected between a computer system and an external storage device. The recording-data encryption device includes storing means for storing key information, and encrypting means for encrypting data transmitted from the computer system, using the key information, and transferring the resulting encrypted data to the external storage device. The recording-data encryption device also includes decrypting means for decrypting encrypted data read from the external storage device, using the key information, and transferring the resulting decrypted data to the computer system, and protocol controlling means for monitoring the encrypting means and the decrypting means and controlling the operations thereof. With the configuration described above, without changing the configurations of the computer system and the external storage device, data that is stored on the external storage device can be encrypted, so that leakage of data stored in the external storage device can be prevented. Furthermore, the key information can be stored on a second external storage device, which is a removable device such as an IC card.

According to Japanese Patent Laid-Open No. 4-98552, an image scanner, a display, a printer, or data processing means for controlling an operation panel controls the encrypting means and the decrypting means. That is, according to the related art, the encrypting means and the decrypting means can be separated from the data processing means. Thus, from the perspective of physical configuration, the related art can be classified as the third approach (a bridging device is newly provided).

However, since the data processing means controls the encrypting means and the decrypting means, from the perspective of functional configuration, the related art can be classified as the first approach (an encryption and decryption function is added within the computer system). This causes a considerable change in the configuration of the computer system.

According to Japanese Patent Laid-Open No. 11-85621, data that is stored on an external storage device is encrypted without changing the configurations of the computer system and the external storage device, thereby preventing leakage of the data stored on the external storage device. That is, data is encrypted as a countermeasure against the threat of stealing of the external storage device alone. However, since key information used for encryption is stored in the recording-data encryption device, when the external storage device and the recording-data encryption device are stolen together, data stored on the external storage device can be readily accessed by connecting both the external storage device and the recording-data encryption device to another computer system.

In the method according to the related art, the key information can be stored on a second external storage device, which is a removable device such as an IC card. However, when the external storage device, the recording-data encryption device, and the second storage device are all stolen together, data stored on the external storage device can be accessed similarly to the case described above. Thus, the problem is not essentially solved.

SUMMARY OF THE INVENTION

In view of the situation described above, the present invention provides an improved data processing device and data processing method.

Furthermore, the present invention provides a data processing device that is connected between a storage device and a controlling device that controls the storage device so that security of data transferred between the storage device and the controlling device can be maintained appropriately. The data processing device provides a mechanism for preventing access to the storage device even when the storage device and the data processing device are stolen together. Furthermore, the data processing device provides a mechanism for recognizing commands for access to the storage device and preventing unnecessary access to the storage device, thereby enhancing security.

According to an aspect of the present invention, A data processing device for connection between a storage device and a controlling device that controls the storage device, the data processing device comprising: a first receiving unit configured to receive a command issued from the controlling device; a second receiving unit configured to receive data from the storage device; a determining unit configured to determine whether a command received by the first receiving unit is executable; an encryption and decryption unit configured to encrypt data received from the controlling device and to decrypt data received from the storage device; a first controlling unit configured to exercise control so that a command determined by the determining unit as executable may be issued to the storage device and so that a command determined by the determining unit as unexecutable may not be issued to the storage device; and a second controlling unit configured to exercise control to allow data that is received by the second receiving unit from the storage device in response to a command issued by the first controlling unit to pass through the data processing device without being decrypted when the command is a specific command.

According to another aspect of the present invention, A data processing method for a data processing device connected between a storage device and a controlling device that controls the storage device, the data processing method comprising: receiving a command issued from the controlling device to the storage device; determining whether the command received from the controlling device is executable; and if the command is determined to be executable: encrypting the command issued from the storage device; transferring the encrypted command to the storage device; receiving data from the storage device; decrypting data received from the storage device; and exercising control so that data received from the storage device is either decrypted and transferred to the controlling device in response to the command or the data that is received from the storage device is allowed to pass through the data processing device without being decrypted depending on whether the command is a specific command.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate numerous embodiments, features, and aspects of the invention and, together with the description, serve to explain the principles of the invention.

FIG. 8 is a diagram showing extended commands executable by the data encryption device.

FIG. 9 is a diagram showing commands executable by the data encryption device in a normal mode.

FIG. 10 is a flowchart showing an example of a second control program according to the embodiment.

FIG. 11A is a flowchart showing an example of a third control program according to the embodiment.

FIG. 12 is a flowchart showing an example of a fourth control program according to the embodiment.

FIG. 16 is a diagram showing a memory map of a storage medium (recording medium) storing various data processing programs that are readable by the data encryption device.

DESCRIPTION OF THE EMBODIMENTS

Figure 1:
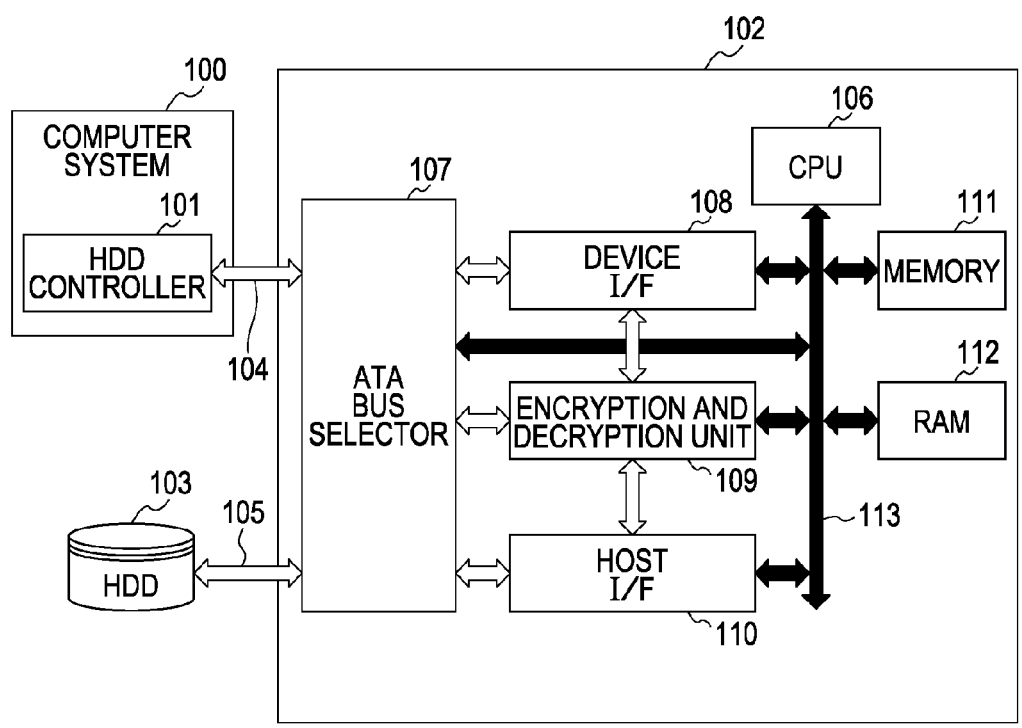
FIG. 1 is a block diagram showing a system in which a data encryption device according to an embodiment of the present invention can be used.

The present invention will now be described in detail with reference to the drawings showing various embodiments thereof. In the drawings, elements and parts which are identical throughout the views are designated by identical reference numerals, and duplicate description thereof is omitted.

Now, an embodiment of the present invention will be described in detail with reference to the drawings.

FIG. 1 is a block diagram showing an example of a system including a data encryption device that functions as a data processing device according to an embodiment of the present invention.

The following description will first be directed to an environment of usage of the data encryption device according to the embodiment, then to the configuration of the data encryption device, and then to operations for maintaining the confidentiality of data by the data encryption device.

Environment of Usage of the Data Encryption Device

As shown in FIG. 1, a data encryption device 102 is connected so as to bridge between a computer system (controlling device) 100 and an HDD 103 that serves as an external storage device. The data encryption device 102 functions as a circuit board that executes data encryption between an HDD controller 101 of the computer system 100 and the HDD 103. The data encryption device 102 is connected to the computer system 100 and the HDD 103 via generic interfaces (e.g., ATA bus interfaces). By using generic interfaces, the data encryption device 102 can be connected without changing the configurations of the computer system 100 and the external storage device 103.

The data encryption device 102 encrypts data transmitted from the computer system 100 and transfers the encrypted data to the HDD 103. Also, the data encryption device 102 decrypts data read from the HDD 103 and transfers the decrypted data to the computer system 100. As will be described later, since data is encrypted with a key possessed by the data encryption device 102 when the data is stored in the HDD 103, even if the HDD 103 is stolen by a third party, it is not possible to decrypt the data without the data encryption device 102. Therefore, when only the HDD 103 is stolen, the security of the data is maintained.

The computer system 100 is a data processing device, for example, a banking system, a desktop publishing (DTP) system, or a multifunction peripheral (MFP), and is not limited to specific types of data processing devices. The external storage device 103 is a device for storing data, for example, a rewritable magnetic or optical disk, such as an HDD, a CD-R, a CD-RW, a DVD-R, or a DVD-RW, and is not limited to specific types of external storage devices. As an example, an HDD is shown as the external storage device 103 in FIG. 1.

In this embodiment, it is assumed that the computer system 100 is a unit having a considerably large scale or a unit disposed in a room under entry/exit management, so that it is physically prohibited to steal the computer system 100. Thus, in this embodiment, considerations will be given to prevention of data leakage in cases where the HDD 103 and the data encryption device 102 are stolen.

Configuration of the Data Encryption Device 102

As shown in FIG. 1, the data encryption device 102 is connected to the HDD controller 101 of the computer system 100 and to the HDD 103. The HDD controller 101 of the computer system 100 and the data encryption device 102 are connected to each other via an ATA bus 104, and the data encryption device 102 and the HDD 103 are connected to each other via an ATA bus 105. ATA is a communication standard generally used for HDDs. The data encryption device 102 interprets control commands transmitted from the HDD controller 101 to the HDD 103, encrypts data to be stored in the HDD 103, and decrypts data read from the HDD 103.

A central processing unit (CPU) 106 controls the data encryption device 102 as a whole. A memory 111 is used to store control programs executed by the CPU 106 and various types of data. The memory 111 functions as a non-volatile memory that can store data needed for data encryption, such as key information. A random access memory (RAM) 112 is used as a work memory for the CPU 106 in execution of the control programs or other programs read from the memory 111.

An ATA bus selector 107 is an interface for connecting the HDD controller 101 with the HDD 103.

A device interface (I/F) 108 is an interface for connecting the HDD controller 101 with an address/data bus 113 via the ATA bus selector 107.

The HDD controller 101 of the computer system 100 issues control commands for controlling the HDD 103. The control commands are first received by the device I/F 108. Commands that are determined as executable are issued from the CPU 106 to a host I/F 110 and then transferred to the HDD 103.

When storing data received from the computer system 100 in the HDD 103, the CPU 106 encrypts the received data in an encryption and decryption unit 109 and then transfers the encrypted data to the HDD 103 via the ATA bus 105. On the other hand, when sending data read from the HDD 103 to the computer system 100, the CPU 106 decrypts the data in the encryption and decryption unit 109 and transfers the decrypted data to the computer system 100 via the ATA bus 104.

The encryption and decryption unit 109 encrypts data when data received from the computer system 100 is stored in the HDD 103. Also, the encryption and decryption unit 109 decrypts data when data read from the HDD 103 is transferred to the computer system 100.

Various encryption algorithms may be used for the data encryption executed in the encryption and decryption unit 109. For example, a secret-key cryptosystem, such as AES (Advanced Encryption Standard), a public-key cryptosystem, such as RSA, or a hybrid cryptosystem based on a combination of a secret-key cryptosystem and a public-key cryptosystem, may be used.

The host I/F 110 is an interface for connecting the HDD 103 with the address/data bus 113 via the ATA bus selector 107.

The individual blocks in the data encryption device 102 are controlled by the CPU 106 via the address/data bus 113.

The ATA bus selector 107 allows the data encryption device 102 to carry out all communications with the HDD controller 101 and the HDD 103 via the ATA via standard interfaces (ATA bus interfaces).

Now, the functions of the data encryption device 102 will be described. The functions of the data encryption device 102 are implemented by executing programs stored in the memory 111.

Authentication Function

Since the data encryption device 102 has an interface (the ATA bus selector 107) for connection with an ATA bus, the data encryption device 102 can be physically connected to any system having an interface for connection with an ATA bus. However, problems arise if the data encryption device 102 is allowed to be connected to any computer system. For example, if the data encryption device 102 and the HDD 103 are stolen by a third party, the third party can illegitimately access data stored in the HDD 103 by connecting the data encryption device 102 and the HDD 103 with a computer system that is different from the computer system 100. Thus, in this embodiment, the data encryption device 102 has an authentication function for executing authentication to check whether a computer system connected to the data encryption device 102 is a valid computer system.

The authentication function can be implemented in various manners, for example, as follows.

In a first scheme of implementing the authentication function, common authentication information is stored in each of the computer system 100 and the data encryption device 102. The computer system 100 is determined as valid when authentication information received from the computer system 100 coincides with authentication information stored in the data encryption device 102.

In a second scheme of implementing the authentication function, common authentication information is stored in each of the computer system 100 and the data encryption device 102. The validity of a computer system is checked by challenge and response authentication using the authentication information.

In a third scheme of implementing the authentication function, a public-key certificate of the computer system 100 is stored in the data encryption device 102. The data encryption device 102 checks the validity of the computer system 100 by receiving and verifying a digital signature of the computer system 100. The data encryption device 102 may receive the public-key certificate together when receiving the digital signature.

Encryption and Decryption Function

The data encryption device 102 also has an encryption and decryption function so that data received from the computer system 100 can be encrypted and data read from the HDD 103 can be decrypted by the encryption and decryption unit 109 using key information.

Control Function

The data encryption device 102 also has a control function. With the control function, it is determined whether information received from the computer system 100 is control information, such as a command, or data, and the encryption and decryption unit 109 is activated to execute encryption only when the information is data. The control function is implemented by the CPU 106 executing a program stored in the memory 111. Furthermore, with the control function, it is determined whether information read from the HDD 103 is control information, such as a response to control information received from the computer system 100, or data, and the encryption and decryption unit 109 is activated to execute decryption only when the information is data.

With the control function, when the data encryption device 102 in an initial state, for example, when key information that is to be used in the encryption and decryption unit 109 is absent, information transmitted and received between the computer system 100 and the HDD 103 is intercepted. The presence or absence of key information is determined by a status management function described later.

Key Generation Function

Next, a key generation function with which the encryption and decryption unit 109 generates key information used for encryption and decryption will be described.

If key information used by the encryption and decryption unit 109 is leaked to a third party, the third party is allowed to decrypt encrypted data stored in the HDD 103. Thus, leakage of the key information used in the encryption and decryption unit 109 to the outside of the data encryption device 102 must be prevented. Thus, the data encryption device 102 has a key generation function for generating key information within itself.

In order to implement the key generation function, the data encryption device 102 receives unique information of the computer system 100 (hereinafter simply referred to as unique information) from the computer system 100. The unique information is information unique to each computer system 100. As the unique information, various types of information can be used, for example, a serial number, a MAC address of the computer system 100 having a LAN interface, or a combination of these types of information.

With the key generation function, key information is generated from the unique information received from the computer system 100 and seed information stored in the memory 111. The method of generating the seed information depends on the method of generating key information and the encryption algorithm used. When a random number can be used as key information in the encryption algorithm used, it is also possible to generate and use a random number or a pseudo-random number as the seed information. On the other hand, when information that satisfies a specific condition has to be used as key information in the encryption algorithm used, for example, it is needed to generate key information and to obtain seed information satisfying "key information=f(seed information, unique information)" using the key information and the seed information.

Various methods can be used to generate key information from unique information and seed information, for example, as follows.

(1) Key information is generated by taking the exclusive OR of the unique information and the seed information.

(2) The unique information and the seed information are input to a one-way hash function and information output from the one-way hash function is used as key information.

(3) The seed information is encrypted using the unique information as a key of an encryption function, and information output from the encryption function is used as key information.

(4) The unique information is encrypted using the seed information as a key of an encryption function, and information output from the encryption function is used as key information.

(5) Key information is shared by the Diffie-Hellman (DH) key agreement method (RFC 2631).

Since it suffices to store key information only in the data encryption device 102, for example, it is possible to use the seed information as a private key of the data encryption device 102 in the DH key agreement method while generating unique information from a public key of the data encryption device 102 and information unique to the computer system 100.

The methods described above are examples of methods for generating key information from unique information and seed information. Without limitation to the examples, the function used in the method of generating key information in this embodiment may be any such two-input function f that can be expressed as "key information=f(seed information, unique information)".

Furthermore, by managing key-verification information together with key information, it is possible to verify the validity of the key information. The key-information verifying information is, for example, a hash value of the key information.

Status Management Function

The data encryption device 102 also has a status management function for determining whether the data encryption device 102 is in an initial state or a non-initial state.

The "initial state" herein refers to a state where seed information used to generate key information by the key generation function is stored in the memory 111 so that key information can be generated. The "non-initial state" herein refers to a state where seed information is not stored in the memory 111 so that it is not possible to generate key information.

With the status management function, seed information is newly generated when it is determined that seed information is not stored in the memory 111, and the seed information generated is stored in the memory 111. The seed information is information unique to the data encryption device 102, and devices other than the data encryption device 102 are not allowed to know the seed information.

Operation of the Data Encryption Device 102

Now, an operation of the data encryption device 102 in this embodiment will be described with reference to FIG. 2.

Figure 2:
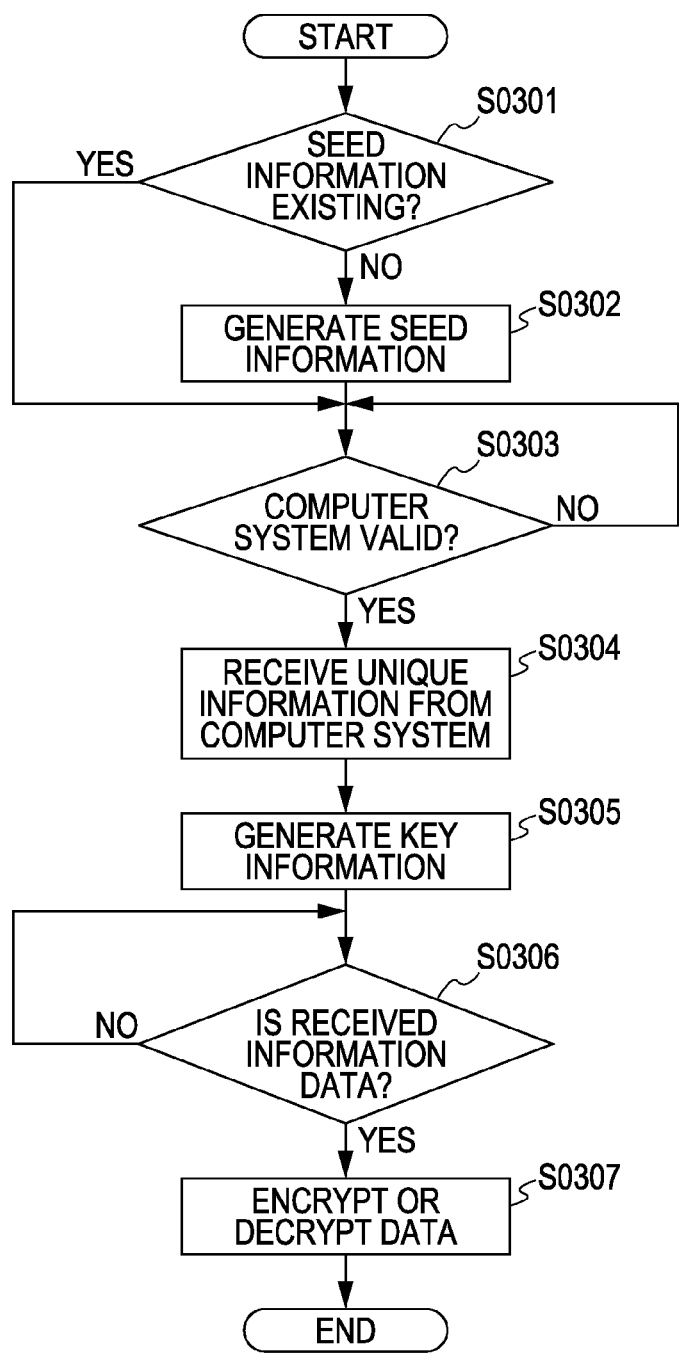
FIG. 2 is a flowchart showing an example of a first control program according to the embodiment.

FIG. 2 is a flowchart showing an example of a first control program according to this embodiment. Processing according to the flowchart is implemented by the CPU 106 executing a program stored in the memory 111. In FIG. 2, S0301 to S0307 denote individual steps.

First, in step S0301, by the status management function, the CPU 106 checks whether seed information is stored in the memory 111 of the data encryption device 102. When it is determined that seed information is not stored in the memory 111, the CPU 106 proceeds to step S0302. In step S0302, the CPU 106 newly generates seed information by the status management information, and stores the seed information in the memory 111.

On the other hand, when it is determined in step S0301 that seed information is stored in the memory 111 of the data encryption device 102, the CPU 106 proceeds directly to step S0303.

Then, in step S0303, by the authentication function, the CPU 106 executes authentication to check whether the computer system 100 is valid. The CPU 106 repeats authentication until authentication succeeds.

When it is determined that authentication of the computer system 100 has succeeded, the CPU 106 proceeds to step S0304. In step S0304, the CPU 106 receives unique information from the computer system 100.

Then, in step S0305, by the key generation function, the CPU 106 generates key information from the unique information and the seed information, and sets the key information in the encryption and decryption unit 109. When key-information verification information is managed together with the key information, it is possible to verify the validity of the key information generated.

Then, in step S0306, the CPU 106 monitors the status of the data encryption device 102 by the status management function. When the data encryption device 102 is in the initial state, for example, when key information is absent, by the control function, the CPU 106 exercises control so as to intercept information transmitted and received between the computer system 100 and the HDD 103. With the status management function, the CPU 106 may determine that key information is not stored when it is possible to verify validity of the key information but verification of the validity of the key information fails.

Furthermore, in step S0306, by the control function, the CPU 106 determines whether information transmitted from the computer system 100 is control information, such as a command, or data. The CPU 106 proceeds to step S0307 and the subsequent steps only when it is determined that the information transmitted from the computer system 100 is data. In step S0307, the CPU 106 activates the encryption and decryption unit 109 to encrypt the data. Also, by the control function, the CPU 106 determines whether information read from the HDD 103 is control information, such as a response, or data. The CPU 106 proceeds to step S0307 only when it is determined that the information is data. In step S0307, the CPU 106 activates the encryption and decryption unit 109 to decrypt the data. The encryption and decryption unit 109 encrypts or decrypts data using the key information generated in step S0305.

Through the procedure described above, it is possible to encrypt data stored in the HDD 103.

Details of Data Encryption and Decryption

The data encryption and decryption in step S0307 shown in FIG. 2 will be described in detail with reference to data flows shown in FIGS. 3 and 4.

Figure 3:
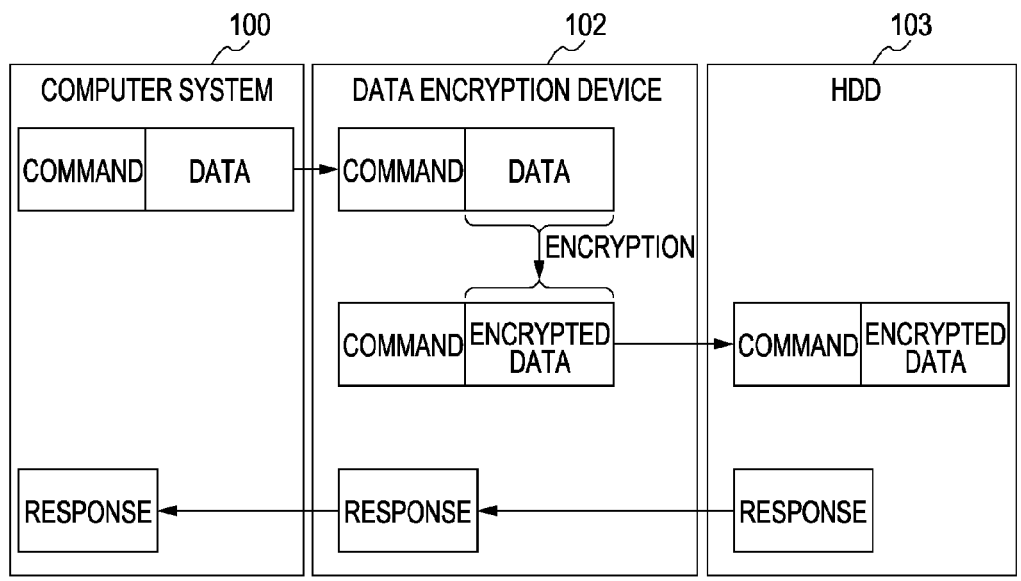
FIG. 3 is a diagram showing a data flow in a case where data is written to an external storage device (e.g., an HDD).

FIG. 3 is a diagram showing a data flow in a case where data transmitted from the computer system 100 is written to the HDD 103.

As shown in FIG. 3, the control function of the CPU 106 receives information including an executable "command" and "data" from the computer system 100. The "command" herein refers to control information indicating writing of data to the HDD 103, and "data" refers to data that is to be written to the HDD 103.

The control function of the CPU 106 activates the encryption and decryption unit 109 to encrypt the "data". Then, the control function of the CPU 106 sends information including the "command" and "encrypted data" obtained by encryption to the HDD 103.

Then, the control function of the CPU 106 receives a "response" from the HDD 103. The response is sent in response to writing of the encrypted data to the HDD 103. Then, the control function of the CPU 106 sends the "response" as control information as it is to the computer system 100.

Figure 4:
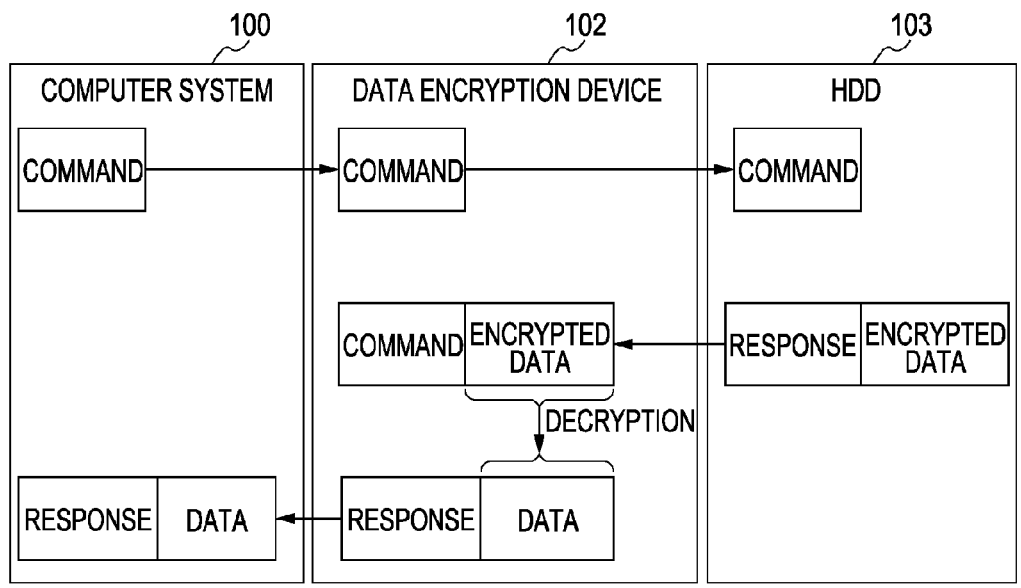
FIG. 4 is a diagram showing a data flow in a case where data is read from an external storage device (e.g., an HDD).

FIG. 4 is a diagram showing a data flow in a case where the computer system 100 reads data from the HDD 103.

The control function of the CPU 106 receives an executable "command" from the computer system 100. The "command" herein is control information indicating reading of data from the HDD 103.

The control function of the CPU 106 sends the "command" received from the computer system 100 as it is to the HDD 103.

Then, the control function of the CPU 106 receives a "response" and "encrypted data" from the HDD 103. The "response" and "encrypted data" are sent in response to reading of the encrypted data from the HDD 103.

Furthermore, the control function of the CPU 106 activates the encryption and decryption unit 109 to decrypt the "encrypted data" read from the HDD 103. Then, the control function of the CPU 106 sends information including the "response" and "data" (decrypted) to the computer system 100.

The data flows shown in FIGS. 3 and 4 are examples. Specific data flows involving a plurality of interfaces depend on specifications of the interface between the computer system 100 and the data encryption device 102 and specifications of the interface between the data encryption device 102 and the HDD 103.

For example, a data flow involving a "command" and a "response" but not involving "data" is possible. Furthermore, the interface between the computer system 100 and the data encryption device 102 may be different from the interface between the data encryption device 102 and the HDD 103. In this case, the control function of the CPU 106 can be implemented by executing conversion between the specifications of these interfaces in addition to data encryption and decryption.

As shown in FIGS. 3 and 4, information that is encrypted in the data encryption device 102 is "data". Thus, when the data encryption device 102 is in the initial state, for example, when key information is absent, the control function of the CPU 106 may intercept only "data" among information transmitted and received between the computer system 100 and the HDD 103.

Furthermore, as described above, the data encryption device 102 may employ various methods of authentication of the computer system 100.

Thus, it is possible to receive unique information from the computer system 100 at the time of authentication of the computer system 100 in step S0304. For example, in the case of an authentication method based on a digital signature and a public-key certificate received from the computer system 100, the public-key certificate may be used as unique information of the computer system 100. When it is possible to receive unique information of the computer system 100 in step S0304 as in the above case, step S0305 may be omitted.

In this embodiment, the data encryption device 102 interconnects the computer system 100 and the HDD 103 via interfaces, and the encryption and decryption unit 109 encrypts data that is written to the HDD 103 under the control of the CPU 106. Accordingly, the confidentiality of data stored in the HDD 103 can be maintained.

Particularly, key information used for encryption or decryption is generated from unique information of the computer system 100 and seed information unique to the data encryption device 102. Thus, it is not possible to generate valid key information on the basis of a different pair of a computer system and a data encryption device.

Furthermore, by executing authentication of the computer system 100 prior to receiving unique information of the computer system 100, unique information of the valid computer system 100 is received.

Thus, even if the data encryption device 102 and the HDD 103 are stolen together, the confidentiality of data in the HDD 103 can be maintained. Furthermore, the data encryption device 102 manages the presence or absence of seed information as status regarding key information by the status management function, and automatically generates seed information for generating key information when key information is absent. Thus, automatic management of key information is achieved.

Operation Modes of the Data Encryption Device 102

Now, operation modes of the data encryption device 102 will be described with reference to FIG. 5.

Figure 5:
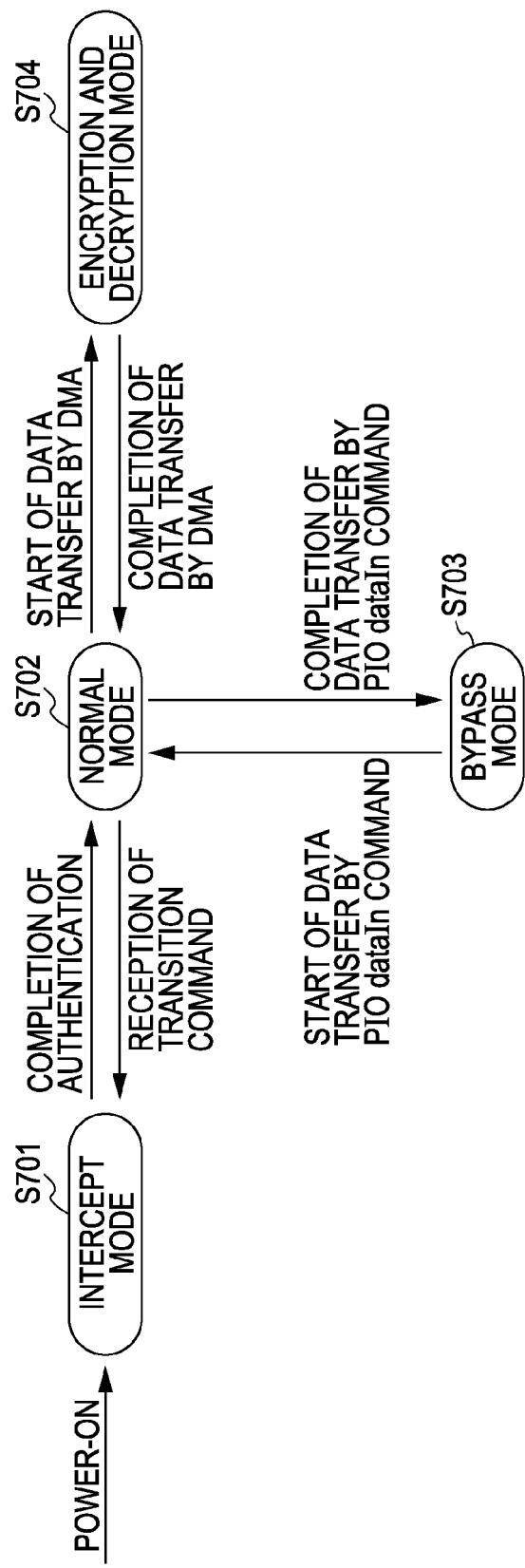
FIG. 5 is a state transition diagram for explaining operation modes of the data encryption device.

FIG. 5 is a state transition diagram showing operation modes of the data encryption device 102.

The operation modes of the data encryption device 102 can be generally classified into two types, namely, "intercept mode" and "active mode". The "active mode" includes "normal mode", "bypass mode", and "encryption and decryption mode". The mode of operation of the data encryption device 102 is determined by the CPU 106 executing a program stored in the memory 111.

When the data encryption device 102 is powered on, the data encryption device 102 initially enters an intercept mode S701. In the intercept mode, any information sent by the HDD controller 101 is not transmitted to the HDD 103.

At this time, register read/write operations, which involve accesses from the HDD controller 101 to the HDD 103, are all directed to the data encryption device 102, and accesses to the HDD 103 are intercepted.

At this time, it is not allowed to use normal commands that are used to access the HDD 103, and only extended commands (described later with reference to FIG. 8) that are newly defined can be used.

In the intercept mode S701, the CPU 106 is allowed to execute only the authentication function described earlier. Only when the computer system 100 is authenticated as valid by the authentication function, the data encryption device 102 is allowed to change its operation mode from the intercept mode to a normal mode S702.

Whether a command issued by the HDD controller 101 is executable at the HDD 103 is determined on the basis of reference data stored in the memory 111 of the data encryption device 102. The data encryption device 102 receives the command issued from the HDD controller 101 by the device I/F 108 via the ATA bus selector 107, and the CPU 106 recognizes the command via the address/data bus 113. Then, the CPU 106 determines whether the command is executable at the HDD 103 by comparing the command with the reference data in the memory 111.

In the normal mode S702, the HDD controller 101 accesses the HDD 103. However, the data encryption device 102 determines whether each command issued by the HDD controller 101 is executable at the HDD 103, and passes the command to the HDD 103 only when the command is determined as executable (FIG. 9). When the command is determined as unexecutable, the command is not transferred to the HDD 103.

Whether the command received from the computer system 100 is executable is determined in a manner similar to the manner in the intercept mode S701. The reference data in the memory 111 is changed in accordance with the individual operation modes. That is, executable commands differ depending on the operation modes.

Furthermore, in the normal mode S702, a command that is determined by the CPU 106 as executable is sent to the host I/F 110 by the CPU 106. Then, the data encryption device 102 transfers (issues) the command to the HDD 103 via the ATA bus selector 107.

Then, upon receiving a register access command ("PIO READ" type command described later) to the HDD 103, the data encryption device 102 changes its operation mode from the normal mode S702 to a bypass mode S703. This will be described later in more detail.

On the other hand, when a DMA-transfer type command requesting storage of data to or reading of data from the HDD 103 is received, the data encryption device 102 changes its operation mode from the normal mode S702 to an encryption and decryption mode S704.

Furthermore, when a "CHANGE INTERCEPT" (FIG. 8) command is received among the extended commands specially defined, the data encryption device 102 changes its operation mode from the normal mode S702 to the intercept mode S701.

The bypass mode S703 is used to execute a register access to the HDD 103 ("PIO READ" type access) while in the normal mode S702. In the bypass mode S703, a register access of the HDD controller 101 is bypassed to the HDD 103. Upon completion of transfer of register data of the HDD 103 to the computer system 100, the data encryption device 102 changes its operation mode from the bypass mode S703 to the normal mode S702.

The encryption and decryption mode S704 is used to encrypt data that is to be stored in the HDD 103 by DMA transfer or to decrypt data that is read from the HDD 103 by DMA transfer. Upon completion of the DMA transfer, the data encryption device 102 changes its operation mode from the encryption and decryption mode S704 to the normal mode S702.

Configuration of the ATA Bus Selector 107

Now, the configuration of the ATA bus selector 107 shown in FIG. 1 will be described with reference to FIG. 6.

Figure 6:
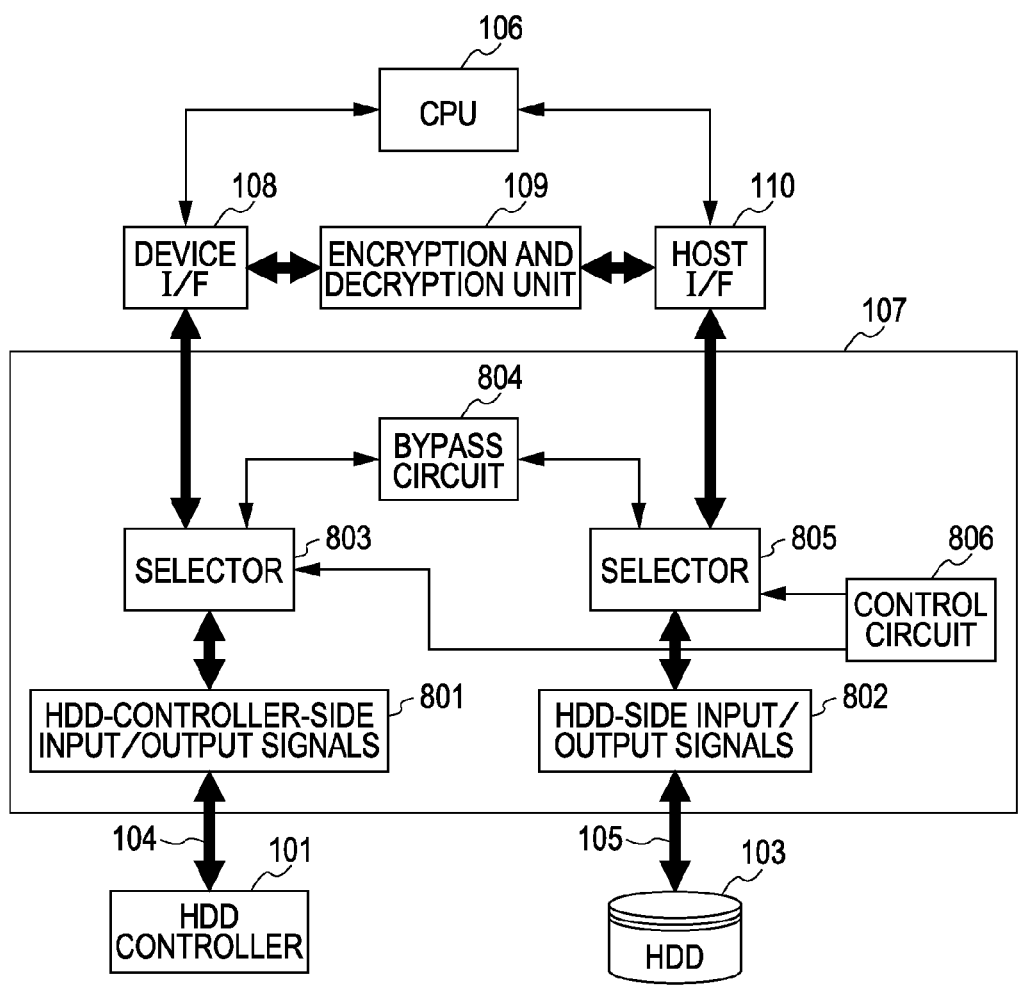
FIG. 6 is a block diagram showing the configuration of an ATA bus selector shown in FIG. 1.

FIG. 6 is a block diagram showing the configuration of the ATA bus selector 107 shown in FIG. 1.

As shown in FIG. 6, the HDD controller 101 is connected to HDD-controller-101-side input/output signals 801 for input and output of signals. Furthermore, the HDD 103 is connected to HDD-103-side input/output signals 802.

The HDD-controller-101-side input/output signals 801 are connected to the device I/F 108 or a bypass circuit 804 via a selector 803.

Similarly, the HDD-103-side input/output signals 802 are connected to the host I/F 110 or the bypass circuit 804 via a selector 805.

Each of the selector 803 and the selector 805 is controlled by the CPU 106 via a control circuit 806.

The HDD controller 101 and the HDD 103 are connected to each other via the bypass circuit 804, the encryption and decryption unit 109, or the CPU 106.

Operation of the ATA Bus Selector 107

Now, operations of the ATA bus selector 107 shown in FIG. 6, in individual operation modes of the data encryption device 102, will be described with reference to FIGS. 7A to 7C.

Figure 7A:
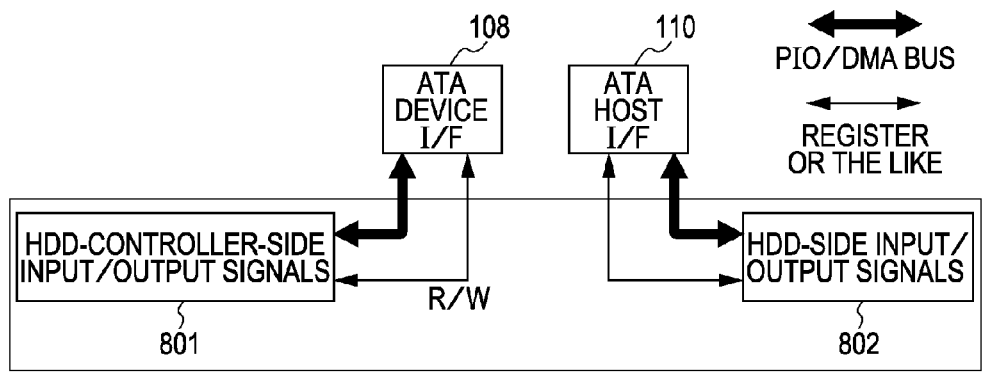
FIGS. 7A to 7C are diagrams for explaining operations of the ATA bus selector, shown in FIG. 6, in individual operation modes of the data encryption device.
Figure 7B:
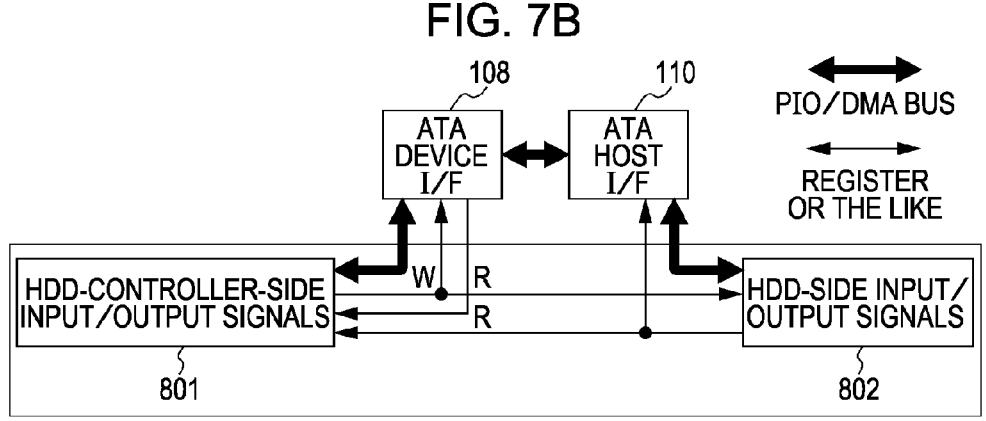
Figure 7C:
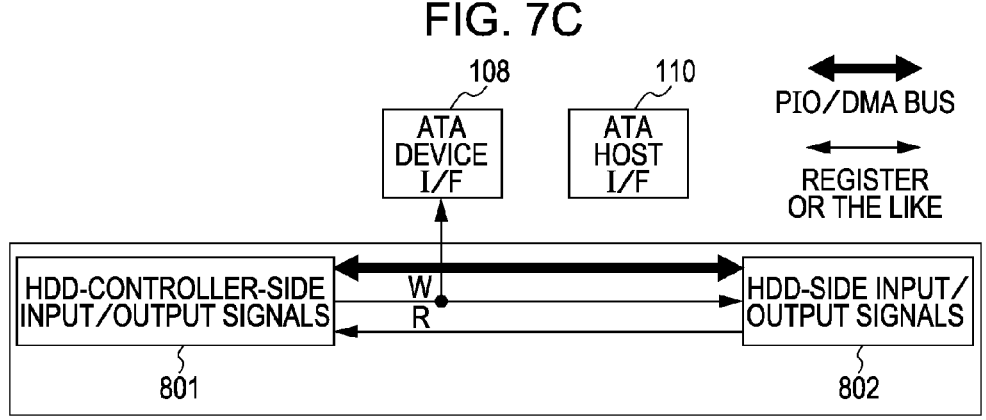

FIGS. 7A to 7C are diagrams for explaining operations of the ATA bus selector 107, shown in FIG. 6, in individual operation modes of the data encryption device 102. FIGS. 7A to 7C show connection of data buses and direction of transfer in each of the operation modes.

In FIGS. 7A to 7C, a solid arrow indicates a PIO/DMA bus for transmitting and receiving data. A thin arrow indicates an access to a register or the like for operation setting, status checking, or the like.

The operation of the ATA bus selector 107 in the intercept mode will be described with reference to FIG. 7A.

In the intercept mode, in the ATA bus selector 107, input/output signals on the side of the HDD controller 101 are connected to the device I/F 108, and input/output signals on the side of the HDD 103 are connected to the host I/F 110.

Thus, any access from the HDD controller 101 to the HDD 103 is prohibited until completion of mutual authentication.

Next, the operation of the ATA bus selector 107 in the normal mode will be described with reference to FIG. 7B.

In the normal mode, the PIO/DMA bus is connected to the device I/F 108 and the host I/F 110.

Furthermore, referring to FIG. 7B, when a write access ("W") from the HDD controller 101 to the HDD 103 is issued, a change in the access destination is indicated by the input/output signals on the side of the HDD controller 101 in accordance with the type of a register to be accessed. For example, it is indicated that data be written only to a register in the device I/F 108, connection with the input/output signals on the side of the HDD 103 be maintained so that data is written only to a register in the HDD 103, or data be written to both. For example, when the HDD controller 101 accesses a register for setting parameters, data is written to both the register in the data encryption device 102 and the register in the HDD 103.

Similarly, in the case of a register read ("R") access, it is indicated that data in the HDD 103 be read directly or data read by the host I/F 110 be read via the device I/F 108.

Next, the operation of the ATA bus selector 107 in the bypass mode will be described with reference to FIG. 7C.

In the bypass mode, input/output signals on the host side and input/output signals on the side of the HDD 103 are connected directly. In the case of some register write accesses, the same data is written to the register in the HDD 103 and the register in the device I/F 108.

Extended Commands Executable by the Data Encryption Device 102 in the Intercept Mode FIG. 8 is a diagram showing extended commands executable by the data encryption device 102.

As opposed to ATA commands used for ordinary HDD accesses, the extended commands shown in FIG. 8 can only be processed by the data encryption device 102. The commands are registered as executable extended commands in the memory 111 shown in FIG. 1.

The extended commands shown in FIG. 8 are commands executable by the data encryption device 102 in the intercept mode S701 shown in FIG. 5.

In FIG. 8, a command name column 1001 shows names of executable commands. A type column 1002 shows access types. For example, a "Non DATA" type command is a command that does not involve transfer of data, such as a command for checking status or a command for transition from the intercept mode to the normal mode. "WRITE" type and "READ" type commands are commands that involve writing and reading of data, and are used, for example, to obtain version information or for authentication challenge.

ATA Commands Executable by the Data Encryption Device 102 in the Normal Mode

FIG. 9 is a diagram showing commands executable by the data encryption device 102 in the normal mode S702. Commands that can be transferred from the HDD controller 101 to the HDD 103 are limited to the commands shown in FIG. 9. This means that the commands shown in FIG. 9 can be executed only when the data encryption device 102 has authenticated the computer system 100 as valid and operates in the normal mode. Thus, unnecessary access to the HDD 103 is prevented so that security is maintained. The commands are registered as ATA commands in the memory 111 shown in FIG. 1.

In FIG. 9, a command name column 1101 shows names of executable commands. A type column 1102 shows access types. A "Non DATA" transfer type command is a command that does not involve transfer of data. A "PIO READ" transfer type command is a command that involves reading of data. A "DMA" transfer (encryption/decryption) type command is a command that involves writing and reading of data.

A "PIO READ" transfer type command is a command for transferring data between a main memory of the computer system 100 and the HDD 103 under the control of a CPU in the computer system 100.

On the other hand, a "DMA" transfer type command is a command for transferring data between a RAM of the computer system 100 and the HDD 103 without the intervention of the CPU of the computer system 100.

In the normal mode S702, when a command is issued from the HDD controller 101, the command is temporarily stored in the data encryption device 102, and the CPU 106 checks whether the command is executable at the HDD 103. The command is sent to the HDD 103 only when it is determined that the command is executable at the HDD 103 (the commands shown in FIG. 9). When it is determined that the command is unexecutable (commands other than the commands shown in FIG. 9), the command is not sent to the HDD 103, and an abort error is reported to the HDD controller 101.

Details of Authentication of the Computer System 100

Now, authentication executed between the HDD controller 101 and the data encryption device 102 will be described with reference to FIG. 10 and FIGS. 11A and 11B. Authentication is executed in two types of cases, namely, in cases where the data encryption device 102 is connected to the HDD controller 101 for the first time and in cases where the data encryption device 102 is connected in advance to the HDD controller 101. Authentication that is executed when the data encryption device 102 is connected to the HDD controller 101 for the first time will be described with reference to FIG. 10.

FIG. 10 is a flowchart showing an example of a second control program according to this embodiment, relating to a case where the data encryption device 102 is connected to the computer system 100 for the first time. In FIG. 10, S1201 to S1215 denote individual steps. In this flowchart, steps associated with the data encryption device 102 are implemented by the CPU 106 executing a program stored in the memory 111. Furthermore, steps associated with the HDD controller 101 are implemented by a CPU (not shown) in the HDD controller 101 executing a program stored in a memory. Furthermore, steps associated with the HDD 103 are implemented by a CPU (not shown) in the HDD 103 executing a program stored in a memory.

In step S1201, the computer system 100, the data encryption device 102, and the HDD 103 are all powered on. Then, in step S1202, the CPU 106 of the data encryption device 102 activates the data encryption device 102 in the intercept mode.

In step S1203, the HDD controller 101 checks whether the data encryption device 102 is connected to the computer system 100. It is assumed herein that the computer system 100 is connected to the data encryption device 102. Then, in step S1204, the HDD controller 101 issues a "GET STATUS" command (FIG. 8) to the data encryption device 102 to recognize the operation status of the data encryption device 102. When the data encryption device 102 is connected for the first time, key information has not yet been generated. Thus, in step S1205, the CPU 106 of the data encryption device 102 returns an uninstalled status to the HDD controller 101.

When the uninstalled status is recognized, in step S1206, the HDD controller 101 sends an "INSTALL" command to the data encryption device 102 to execute installation.

In response, in step S1207, the data encryption device 102 generates seed information for generating key information.

Furthermore, in step S1208, the HDD controller 101 sends unique information of the computer system 100 to the data encryption device 102.

Upon receiving the unique information, in step S1209, the CPU 106 of the data encryption device 102 stores the unique information in the RAM 112.

Then, in step S1210, the CPU 106 of the data encryption device 102 generates key information on the basis of the seed information and the unique information, and writes the key information to the memory 111. After generating the key information, in step S1211, the CPU 106 of the data encryption device 102 returns a status indicating completion of generation of key information to the HDD controller 101.

On the basis of the status information received, the HDD controller 101 recognizes that key information has been generated in the data encryption device 102. Then, in step S1212, the HDD controller 101 sends a "CHANGE NORMAL" command (command for transition to the normal mode) to the data encryption device 102.

In response, on the basis of completion of key generation, the CPU 106 of the data encryption device 102 assumes that the computer system 100 has been authenticated as valid. Then, in step S1213, the CPU 106 changes the operation mode of the data encryption device 102 from the intercept mode to the normal mode. After the transition to the normal mode, in step S1214, the CPU 106 of the data encryption device 102 returns a status indicating transition to the normal mode to the HDD controller 101.

Upon receiving the status information, in step S1215, the HDD controller 101 sends various types of ATA commands to the data encryption device 102. Then, the data encryption device 102 exercises control on the basis of the ATA commands received from the HDD controller 101.

Next, authentication that is executed in a case where the data encryption device 102 is connected to the HDD controller 101 in advance will be described.

Figure 11B:
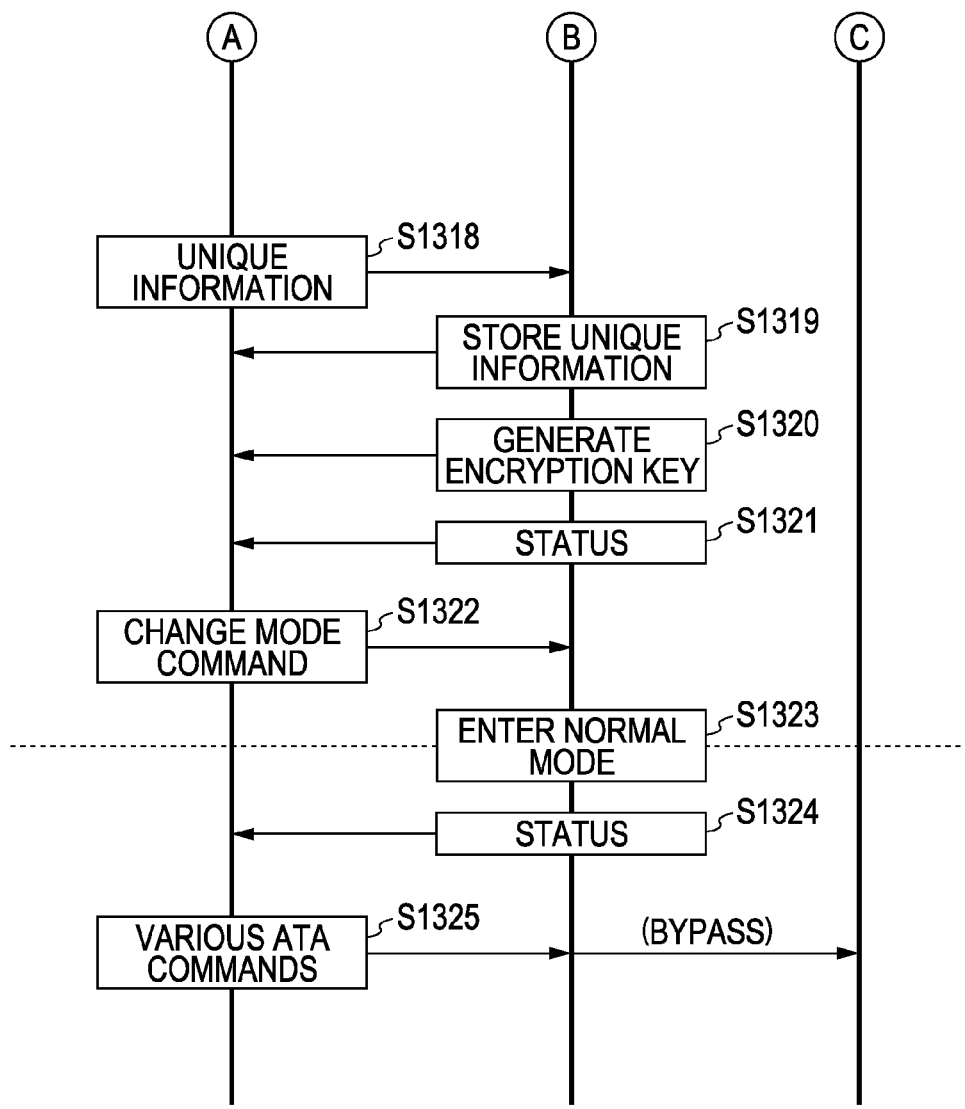
FIG. 11B is a flowchart showing an example of a third control program according to the embodiment.

FIGS. 11A and 11B are flowcharts showing examples of third control programs according to this embodiment, relating to a case where the data encryption device 102 is connected to the computer system 100 in advance. In FIGS. 11A and 11B, S1301 to S1325 denote individual steps. In these flowcharts, steps associated with the data encryption device 102 are implemented by the CPU 106 executing a program stored in the memory 111. Furthermore, steps associated with the HDD controller 101 are implemented by a CPU (not shown) in the HDD controller 101 executing a program stored in a memory. Furthermore, steps associated with the HDD 103 are implemented by a CPU (not shown) in the HDD 103 executing a program stored in a memory.

Although authentication is executed by challenge and response in the example described below, authentication may be executed by other methods.

In step S1301, the computer system 100, the data encryption device 102, and the HDD 103 are all powered on. In step S1302, the CPU 106 of the data encryption device 102 activates the data encryption device 102 in the intercept mode.

In step S1303, the HDD controller 101 checks whether the data encryption device 102 is connected to the computer system 100. It is assumed herein that the computer system 100 is connected to the data encryption device 102. Then, in step S1304, the HDD controller 101 issues a "GET STATUS" command (FIG. 8) to the data encryption device 102 to recognize the operation status of the data encryption device 102. In this example, since the data encryption device 102 has been connected to the computer system 100 and key information has been generated. Thus, in step S1305, the CPU 106 of the data encryption device 102 returns an installed status to the HDD controller 101.

Upon recognizing the installed status, in steps S1306 and S1307, the HDD controller 101 sends a challenge command "SEND CHA1" for executing a challenge and a challenge random number to the data encryption device 102 to proceed to authentication.

In response, in step S1308, the CPU 106 of the data encryption device 102 returns a status to the HDD controller 101.

Then, in step S1309, the HDD controller 101 sends a response requesting command "REQUEST CHA1" to the data encryption device 102. In response, in step S1310, the CPU 106 of the data encryption device 102 returns a response to the challenge random number to the HDD controller 101. Furthermore, in step S1311, the CPU 106 of the data encryption device 102 returns a status to the HDD controller 101.

Upon receiving the response, the HDD controller 101 checks whether the response is correct. When the response is correct, the HDD controller 101 proceeds to step S1312 to issue a challenge from the data encryption device 102 to the HDD controller 101.

In step S1312, the HDD controller 101 sends a "REQUEST CHA2" command for requesting execution of a challenge to the data encryption device 102.

In response, in steps S1313 and S1314, the CPU 106 of the data encryption device 102 sends a challenge random number and a status to the HDD controller 101.

In response, in steps S1315 and S1316, the HDD controller 101 sends a command for requesting execution of a response and a response to the data encryption device 102.

Upon receiving the response, the data encryption device 102 checks whether the response is correct and returns a status. When the response is correct, authentication is completed. Then, the HDD controller 101 proceeds to step S1317 to generate key information. The subsequent steps S1318 to S1325 are the same as steps S1208 to S1215 shown in FIG. 10, so that description thereof will be omitted.

Details of Operation in the Active Mode

As shown in FIG. 5, when authentication is completed in the intercept mode S701, the operation mode changes to the normal mode S702. Now, detailed sequences of commands executable in the active mode will be described with reference to FIGS. 12 to 15.

Commands executable in the normal mode are shown in FIG. 9. The commands can be classified into three types according to types of data transfer, namely, "Non DATA" transfer type that does not involve data transfer, "PIO READ" transfer type, and "DMA" transfer (encryption/decryption) type. These types will be described below in order.

(1) Non DATA Transfer Type

A "Non DATA" transfer type command is executed in two steps. First, the HDD controller 101 sets parameters needed for the command to be executed. The parameters that have been set are written to a relevant register (referred to as a T/F register, an I/O register, a command block register, or the like) in a command block of the HDD 103.

Then, the HDD controller 101 writes a command code representing the "Non DATA" transfer type to a command register of the data encryption device 102. Then, the HDD 103 executes the command (temporarily via the data encryption device 102).

Registers for setting parameters or registers for writing command codes may have different meanings according to whether they are written to or read from by the HDD controller 101. For example, an ERROR/FEATURES register or a STATUS/COMMAND register indicates an error or status of the HDD 103 in a read operation, but indicates execution of a command in a write operation.

Examples of the "Non DATA" transfer type command include a "RECALIBRATE" command and a "SEEK" command.

The "RECALIBRATE" command is used to execute a rezero operation of the HDD 103. The "SEEK" command is used to seek a specified track of the HDD 103 and to select a head.

Next, description will be given with reference to a flowchart shown in FIG. 12.

FIG. 12 is a flowchart showing an example of a fourth control program according to this embodiment, corresponding to a sequence of execution of a "Non DATA" transfer type command. In FIG. 12, S1401 to S1411 denote individual steps. In this flowchart, steps associated with the data encryption device 102 are implemented by the CPU 106 executing a program stored in the memory 111. Furthermore, steps associated with the HDD controller 101 are implemented by a CPU (not shown) in the HDD controller 101 executing a program stored in a memory. Furthermore, steps associated with the HDD 103 are implemented by a CPU (not shown) in the HDD 103 executing a program stored in a memory.

When a "Non DATA" type command is issued in the normal mode, in step S1401, the HDD controller 101 sets parameters for accessing the HDD 103. More specifically, parameters used for data transfer are set to both a register in the data encryption device 102 and a register in the HDD 103.

Then, in step S1402, the HDD controller 101 issues an ATA command ("Non DATA" transfer type command) that is to be executed at the HDD 103 to the command register of the data encryption device 102. Upon receiving the "Non DATA" transfer type ATA command from the HDD controller 101, the data encryption device 102 sets the ATA command in the register of the device I/F 108.

Then, in step S1403, the CPU 106 of the data encryption device 102 checks whether the command set in the command register is a command executable at the HDD 103. The command is set (transferred) to the command register of the HDD 103 only when the command is determined as executable (command registered in the reference data in the memory 111 (FIG. 9)). That is, in the case of a "Non DATA" transfer type command, it is checked by the data encryption device 102 whether the command is executable, and the command is transferred to the HDD 103 only when it is determined that the command is executable. In this example, it is assumed that the "Non DATA" type ATA command is determined as executable at the HDD 103 and is transferred from the data encryption device 102 to the HDD 103.

Then, in step S1404, the HDD 103 interprets and executes the ATA command transferred from the data encryption device 102. This concludes the execution of the command. Then, in step S1405, the HDD 103 outputs an interrupt signal to the data encryption device 102. The interrupt signal is output only to the data encryption device 102. Upon receiving the interrupt signal, in step S1406, the CPU 106 of the data encryption device 102 reads information such as status and error from the registers of the HDD 103.

After the registers of the HDD 103 are read by the data encryption device 102, in step S1407, the HDD 103 clears the interrupt signal.

Then, in step S1408, the CPU 106 of the data encryption device 102 sets the data of status and error of the HDD 103 read from the registers of the HDD 103 to the registers of the data encryption device 102. Then, in step S1409, the CPU 106 of the data encryption device 102 sends an interrupt signal to the HDD controller 101.

Upon receiving the interrupt signal from the data encryption device 102, in step S1410, the HDD controller 101 reads the information such as status and error from the registers of the data encryption device 102.

Then, in step S1411, the CPU 106 of the data encryption device 102 clears the interrupt signal. This concludes the execution of the "Non DATA" transfer type command.

(2) PIO READ Transfer Type

Next, a flow of execution of a "PIO READ" transfer type command will be described with reference to FIG. 13.

An example of the "PIO READ" transfer type command executable in the normal mode is "IDENTIFY DEVICE" command, as shown in FIG. 9. When the "IDENTIFY DEVICE" command is executed, parameter information (512 bytes) of the HDD 103 is read. The parameter information includes information specific to the HDD 103, such as the number of cylinders or heads of the HDD 103 or a serial number of the HDD 103. The information specific to the HDD 103 differs from the data written from the HDD controller 101 to the HDD 103. That is, the information specific to the HDD 103 is data that is not encrypted.

Figure 13:
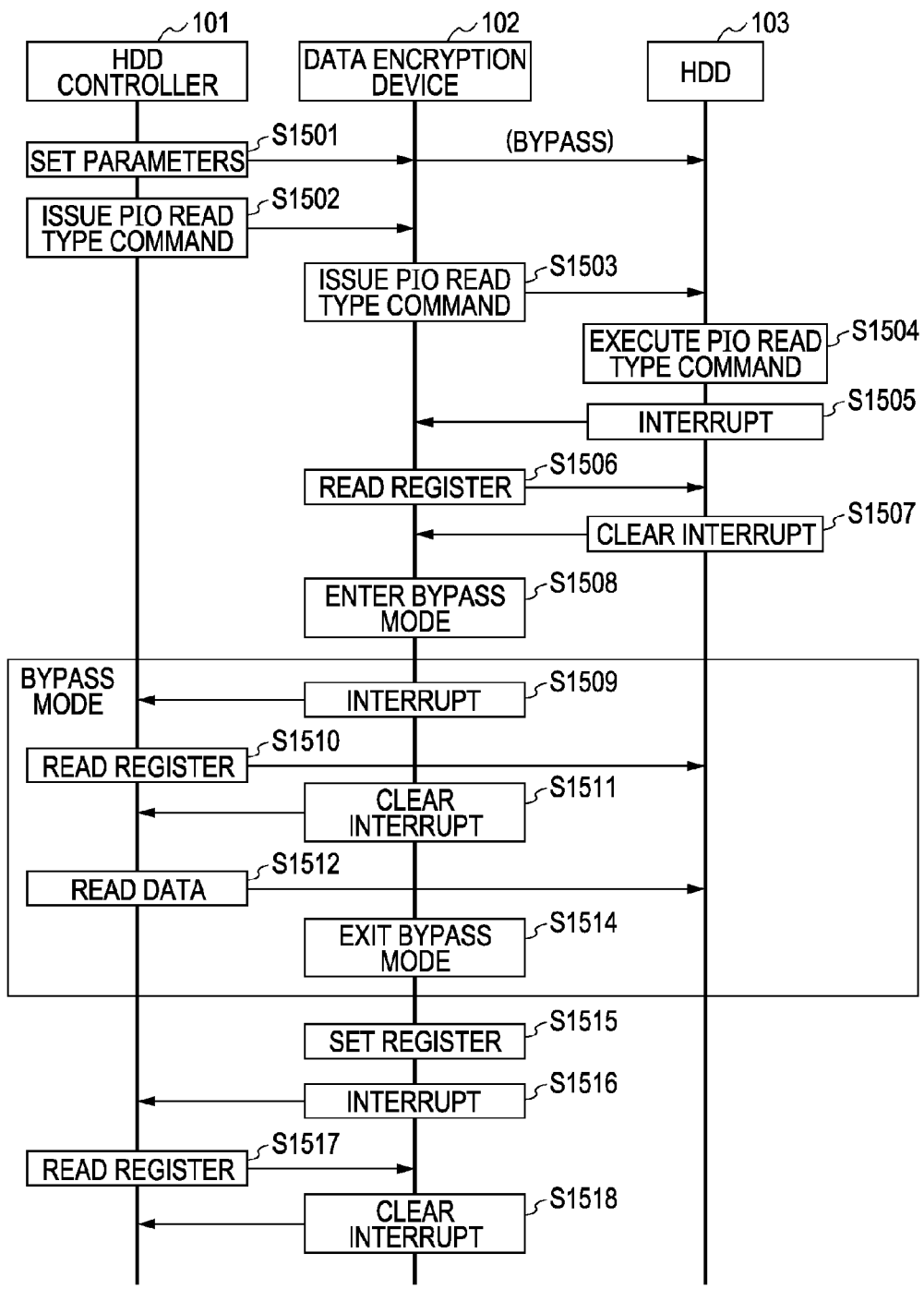
FIG. 13 is a flowchart showing an example of a fifth control program according to the embodiment.

FIG. 13 is a flowchart showing an example of a fifth control program according to this embodiment, corresponding to a sequence of execution of a "PIO READ" transfer type command. In FIG. 13, S1501 to S1518 denote individual steps. In this flowchart, steps associated with the data encryption device 102 are implemented by the CPU 106 executing a program stored in the memory 111. Furthermore, steps associated with the HDD controller 101 are implemented by a CPU (not shown) in the HDD controller 101 executing a program stored in a memory. Furthermore, steps associated with the HDD 103 are implemented by a CPU (not shown) in the HDD 103 executing a program stored in a memory.

When a "PIO READ" transfer type command is issued in the normal mode, first, in step S1501, the HDD controller 101 sets parameters for accessing the HDD 103 to registers. The parameters are set to both a register in the data encryption device 102 and a register in the HDD 103.

Then, in step S1502, the HDD controller 101 issues an ATA command ("PIO READ" transfer type command) that is to be executed at the HDD 103 to the command register of the data encryption device 102. Upon receiving the "PIO READ" transfer type ATA command from the HDD controller 101, the data encryption device 102 sets the ATA command to the register of the device I/F 108.

Then, in step S1503, the CPU 106 of the data encryption device 102 checks whether the command set to the command register is executable at the HDD 103. The command is set (transferred) to the command register of the HDD 103 only when the command is determined as executable (command registered in the reference data in the memory 111 (FIG. 9)). That is, in the case of a "PIO READ" transfer type command, it is checked by the data encryption device 102 whether the command is executable, and the command is transferred to the HDD 103 only when the command is determined as executable. It is assumed herein that the "PIO READ" transfer type ATA command is determined as executable at the HDD 103 and is transferred from the data encryption device 102 to the HDD 103.

In step S1504, the HDD 103 interprets and executes the ATA command transferred from the data encryption device 102. For example, in the case of the "IDENTIFY DEVICE" command, the HDD 103 places requested parameter information in a sector buffer of the HDD 103, and writes a status for the issued command to a register. Then, in step S1505, the HDD 103 outputs an interrupt signal to the data encryption device 102.

Upon receiving the interrupt signal, in step S1506, the CPU 106 of the data encryption device 102 reads information from the register of the HDD 103 to check the status of the HDD 103. After the information is read by the data encryption device 102 from the register of the HDD 103, in step S1507, the HDD 103 clears the interrupt signal.

Then, in step S1508, the CPU 106 of the data encryption device 102 executes setting of the ATA bus selector 107 to change the operation mode of the data encryption device 102 from the normal mode to the bypass mode. Upon completion of the setting for the bypass mode, in step S1509, the CPU 106 of the data encryption device 102 outputs an interrupt signal to the HDD controller 101, thereby notifying the HDD controller 101 that the HDD 103 is ready.

Upon receiving the interrupt signal, in step S1510, the HDD controller 101 reads information such as status and error of the HDD 103 from the registers of the HDD 103. Upon recognizing that the information has been read from the status register of the HDD 103, in step S1511, the data encryption device 102 clears the interrupt signal to the HDD controller 101.

Then, in step S1512, the HDD controller 101 reads data (parameter information or the like) set in the sector buffer of the HDD 103.

Upon detecting that a predetermined number of pieces of data have been read, in step S1514, the CPU 106 of the data encryption device 102 executes setting of the ATA bus selector 107 to exit the bypass mode.

After exiting the bypass mode, in step S1515, the CPU 106 of the data encryption device 102 sets status and error information to the registers of the data encryption device 102. Furthermore, in step S1516, the CPU 106 of the data encryption device 102 outputs an interrupt signal to the HDD controller 101.

Upon receiving the interrupt signal from the data encryption device 102, in step S1517, the data encryption device 102 reads status information and error information from the status register and the error register of the data encryption device 102.

Then, in step S1518, the CPU 106 of the data encryption device 102 clears the interrupt signal. This concludes the execution of the "PIO READ" transfer type command.

(3) DMA Transfer Type

Next, DMA transfer for writing data to the HDD 103 or reading data from the HDD 103 will be described with reference to FIG. 14.

Two types of DMA transfer operation exist, namely, a "READ DMA" operation for reading data from the HDD 103 and a "WRITE DMA" operation for writing data to the HDD 103. The data encryption device 102 encrypts data in the "WRITE DATA" operation and decrypts data in the "READ DATA" operation.

Figure 14:
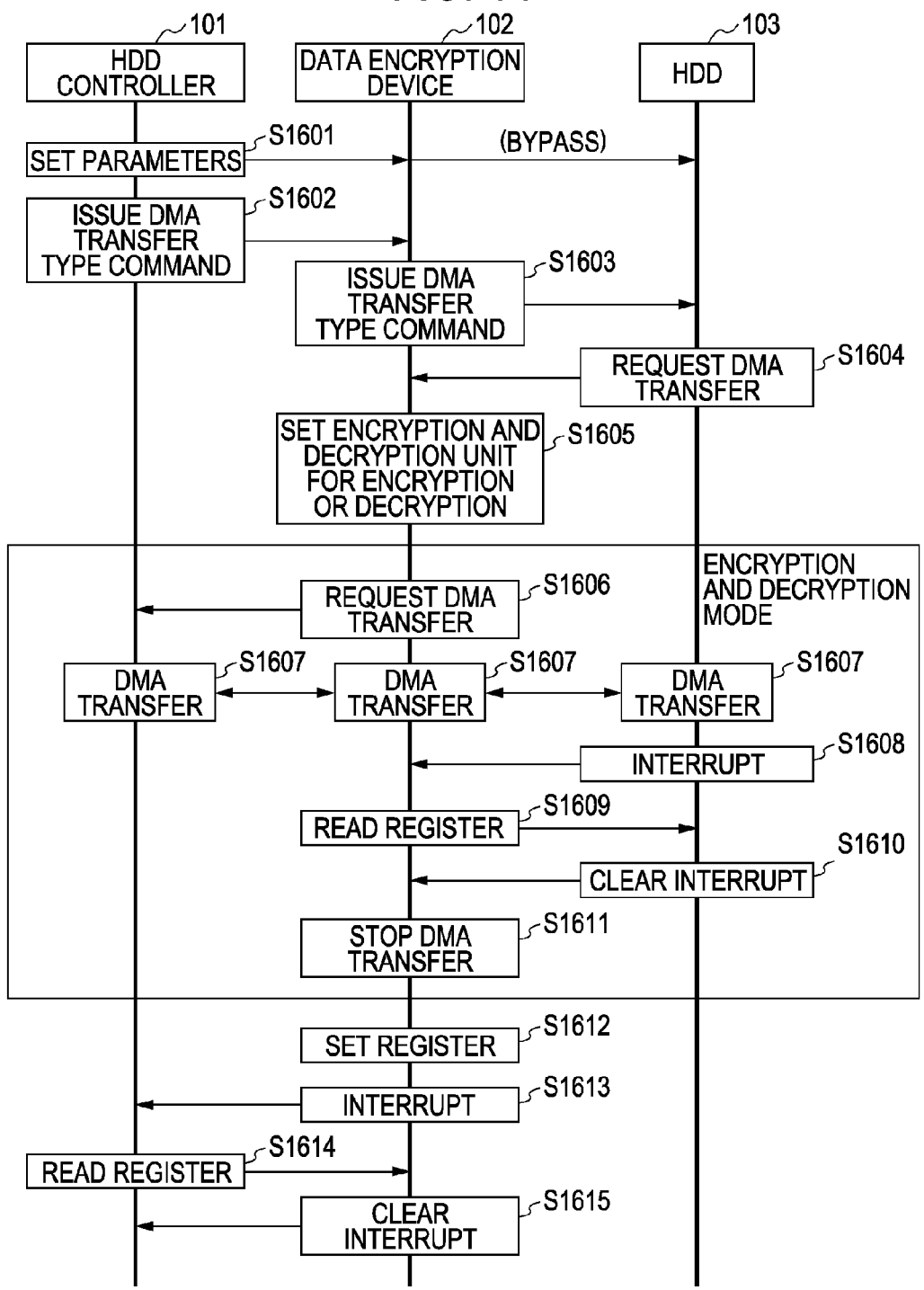
FIG. 14 is a flowchart showing an example of a sixth control program according to the embodiment.

FIG. 14 is a flowchart showing an example of a sixth control program according to this embodiment, corresponding to a sequence of execution of a DMA transfer type command. In FIG. 14, S1601 to S1615 denote individual steps. In this flowchart, steps associated with the data encryption device 102 are implemented by the CPU 106 executing a program stored in the memory 111. Furthermore, steps associated with the HDD controller 101 are implemented by a CPU (not shown) in the HDD controller 101 executing a program stored in a memory. Furthermore, steps associated with the HDD 103 are implemented by a CPU (not shown) in the HDD 103 executing a program stored in a memory.

When a DMA transfer type command is issued in the normal mode, first, in step S1601, the HDD controller 101 sets parameters for accessing the HDD 103.

Then, in step S1602, the HDD controller 101 issues an ATA command (DMA transfer type command) that is to be executed at the HDD 103 to the command register of the data encryption device 102. Upon receiving the DMA transfer type ATA command from the HDD controller 101, the data encryption device 102 sets the ATA command to the register of the device I/F 108.

Then, in step S1603, the CPU 106 of the data encryption device 102 checks whether the command sent to the command register is executable at the HDD 103. The command is sent (transferred) to the command register of the HDD 103 only when the command is executable (command registered in the reference data in the memory 111 (FIG. 9)). That is, in the case of a DMA transfer type command, it is checked by the data encryption device 102 whether the command is executable, and the command is transferred to the HDD 103 only when the command is determined as executable. It is assumed herein that the DMA transfer type ATA command is determined as executable at the HDD 103 and is transferred from the data encryption device 102 to the HDD 103.

Then, the HDD 103 makes preparations for DMA transfer. When the HDD 103 becomes ready, in step S1604, the HDD 103 outputs a DMA transfer request signal to the data encryption device 102.

Upon receiving the DMA transfer request signal from the HDD 103, in step S1605, the CPU 106 of the data encryption device 102 makes setting of the encryption and decryption unit 109 to execute encryption or decryption. The CPU 106 sets the encryption and decryption unit 109 to execute decryption when the name of the command issued by the HDD controller 101 is "READ_DMA", while setting the encryption and decryption unit 109 to execute encryption when the name of the command is "WRITE_DMA".

Then, in step S1606, the CPU 106 of the data encryption device 102 outputs a DMA transfer request to the HDD controller 101.

Then, in step S1607, the HDD controller 101 and the HDD 103 execute DMA transfer via the data encryption device 102. In the DMA transfer operation, the encryption and decryption unit 109 of the data encryption device 102 encrypts or decrypts data that is transferred by DMA.

Upon completion of DMA transfer of a predetermined number of pieces of data, in step S1608, the HDD 103 outputs an interrupt signal to the data encryption device 102.

Upon receiving the interrupt signal, the CPU 106 of the data encryption device 102 checks the status register of the HDD 103 in step S1609. Then, in step S1610, the HDD 103 clears the interrupt signal.

Then, in step S1611, the CPU 106 of the data encryption device 102 stops DMA transfer of data from the HDD 103 to the HDD controller 101. Upon completion of the DMA transfer, the CPU 106 of the data encryption device 102 makes internal setting to change the operation mode of the data encryption device 102 from the encryption and decryption mode to the normal mode.

Then, in step S1612, the CPU 106 of the data encryption device 102 stores status and error information, read from the status register of the HDD 103 in step S1609, in the registers of the data encryption device 102. Furthermore, in step S1613, the CPU 106 of the data encryption device 102 sends an interrupt signal to the HDD controller 101.

Upon receiving the interrupt signal from the data encryption device 102, in step S1614, the HDD controller 101 reads status and error information stored in the registers of the data encryption device 102.

Then, in step S1615, the CPU 106 of the data encryption device 102 clears the interrupt signal. This concludes the execution of the DMA transfer type command.

(4) PIO WRITE Type

Next, execution of a "PIO WRITE" transfer type command for writing data to the HDD 103 will be described with reference to FIG. 15.

Examples of ordinary ATA commands include "PIO WRITE" transfer type commands for writing data to the HDD 103, such as a "WRITE MULTIPLE" command. In this embodiment, writing of data to the HDD 103 is restricted. Thus, "PIO WRITE" transfer type commands, such as the "WRITE MULTIPLE" command, are excluded from available commands (commands executable at the HDD 103). That is, "PIO WRITE" transfer type commands are not registered in the reference data in the memory 111 as ATA commands that can be used.

Thus, even when a "PIO WRITE" transfer type command, such as the "WRITE MULTIPLE" command, is issued by the HDD controller 101, the CPU 106 of the data encryption device 102 determines that the command is unexecutable at the HDD 103, so that the command is not transferred to the HDD 103.

Figure 15:
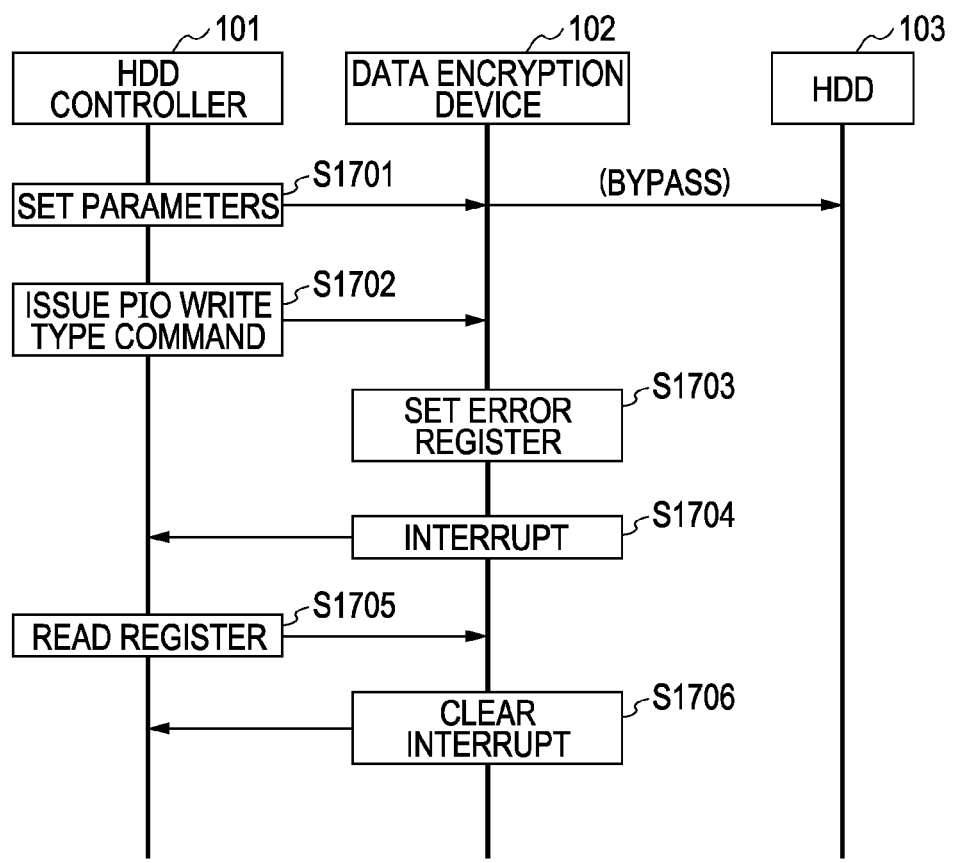
FIG. 15 is a flowchart showing an example of a seventh control program according to the embodiment.

FIG. 15 is a flowchart showing an example of a seventh control program according to this embodiment, corresponding to a sequence of execution of a "PIO WRITE" transfer type command. In FIG. 15, S1701 to S1706 denote individual steps. In this flowchart, steps associated with the data encryption device 102 are implemented by the CPU 106 executing a program stored in the memory 111. Furthermore, steps associated with the HDD controller 101 are implemented by a CPU (not shown) in the HDD controller 101 executing a program stored in a memory. Furthermore, steps associated with the HDD 103 are implemented by a CPU (not shown) in the HDD 103 executing a program stored in a memory.

When a "PIO WRITE" type command is issued in the normal mode, first, in step S1701, the HDD controller 101 sets parameters for accessing the HDD 103 to registers. The parameters are set to both a register in the data encryption device 102 and a register in the HDD 103.

Then, in step S1702, the HDD controller 101 issues an ATA command ("PIO WRITE" transfer type command) that is to be executed at the HDD 103 to the command register of the data encryption device 102. Upon receiving the "PIO WRITE" type ATA command from the HDD controller 101, the data encryption device 102 sets the ATA command to the register of the device I/F 108.

Then, in step S1703, the CPU 106 of the data encryption device 102 checks whether the command set to the command register is a command executable at the HDD 103. The command is set (transferred) to the command register of the HDD 103 only when the command is determined as executable (command registered in the reference data in the memory 111 (FIG. 9)). That is, the "PIO WRITE" transfer type command is determined by the data encryption device 102 as an unexecutable command, so that the command is not transferred to the HDD 103.

In step S1703, the CPU 106 of the data encryption device 102 sets information indicating a command error to the error register of the data encryption device 102. Then, in step S1704, the CPU 106 of the data encryption device 102 sends an interrupt signal to the HDD controller 101.

Upon receiving the interrupt signal from the data encryption device 102, in step S1705, the HDD controller 101 reads information from the status register and the error register of the data encryption device 102. Thus, the HDD controller 101 recognizes occurrence of a command error.

Then, in step S1706, the CPU 106 of the data encryption device 102 clears the interrupt signal. This concludes the execution of the "PIO WRITE" transfer type command.

For example, assuming that the computer system 100 is an MFP, "PIO WRITE" transfer type commands described above are not used by MFP by default. Thus, as shown in FIG. 15, when a command that is not used by an MFP by default (e.g., a "PIO WRITE" transfer type command) is issued illegitimately, transfer of the command to the HDD 103 is prohibited. With this configuration, transfer of data to the HDD 103 by bypassing without encryption is prevented reliably.

Thus, according to the configuration of the embodiment, even when the HDD 103 and the data encryption device 102 are stolen together and connected to a different computer system, leakage of data can be prevented.

The above embodiment has been described in the context of an example where transfer of a "PIO WRITE" type command to the HDD 103 is prohibited. However, in the normal mode, the CPU 106 of the data encryption device 102 exercises control so as to prohibit transfer to the HDD 103 of any command that is not registered as ATA commands in the reference data (FIG. 9) in the memory 111. Thus, security of data in the HDD 103 is maintained.

The command registered and the commands not registered in the reference data in the memory 111 are not limited to those in the example described above (FIGS. 8 and 9).

As described above, the data encryption device 102 according to this embodiment bridges between a computer system and an external storage device. Furthermore, the encrypting and decrypting unit 109 encrypts data written to the HDD 103 so that the confidentiality of the HDD 103 can be maintained. Particularly, since key information used for encryption or decryption is generated using unique information of the computer system and unique information of the data encryption device 102, it is not possible to generate valid key information from a different pair of computer system and data encryption device. Thus, a high degree of confidentiality can be achieved.

Furthermore, before the computer system 100 accesses the HDD 103, authentication is executed between the computer system 100 and the data encryption device 102, so that access to HDD 103 is not allowed unless the authentication succeeds.

Furthermore, when the HDD 103 is accessed after completion of the authentication, all commands issued by the computer system 100 are recognized by the data encryption device 102. The CPU 106 of the data encryption device 102 determines whether the commands are executable and restricts commands that are executed, thereby preventing unnecessary access to the HDD 103.

Furthermore, the data encryption device 102 can carry out communications and data transmission and reception with the HDD controller 101 and the HDD 103 all via standard interfaces, without the need for additional signal lines. That is, the specifications of computer system or external storage device need not be changed.

With the configuration described above, it is possible to maintain data security by a data encryption device provided between a computer system and an external storage device.

Thus, a data encryption and storage system that is capable of maintaining a high degree of confidentiality even when a data encryption device and an external storage device are stolen together can be implemented at low cost without changing the specifications of an existing computer system and external storage device.

The sets of commands that are used and corresponding operations are not limited to those described with reference to FIGS. 8 and 9, various sets of commands for various operations can be used depending on applications and intended purposes.

Although an embodiment of the present invention has been described above, the present invention can be implemented in various forms, such as a system, a device, a method, a program, or a storage medium. More specifically, for example, the present invention can be applied to a system including a plurality of devices, or to an independent device.

Now, the configuration of a memory map of a storage medium storing various data processing programs that are readable by a data encryption device according to an embodiment of the present invention will be described with reference to FIG. 16.

FIG. 16 is a diagram showing a memory map of a storage medium (recording medium) storing various data processing programs that are readable by the data encryption device according to this embodiment.

Although not shown, information for managing a set of programs stored in the storage medium, such as version information and author, information that depends on an OS or the like that reads the programs, such as icons for representing the programs, and so forth are also stored in some cases.

Furthermore, data belonging to various programs is also stored in directories associated with the programs. Furthermore, a program for installing various programs to a computer, a program for decompressing a compressed program that is to be installed, and so forth are also stored in some cases.

The functions of the embodiment, shown in FIGS. 2, 10, 11A, 11B, 12, 13, 14, and 15, may be executed by a host computer according to a program installed from outside. In that case, an information set including the program may be supplied to an output device from a storage medium such as a CD-ROM, a flash memory, or a floppy disk, or from an external storage medium via a network. This also falls within the scope of the present invention.

The storage medium storing program code of software implementing the functions of the embodiment described above is supplied to a system or device so that a computer (or a CPU or MPU) of the system or device can read and execute the program code stored in the storage medium. This also falls within the scope of the present invention.

In this case, the novel functions of the present invention is implemented by the program code read from the storage medium, so that the storage medium storing the program code falls within the scope of the present invention.

Thus, as long as the program functions properly, the form of the program does not matter. For example, the program may be in the form of object code, a program executed by an interpreter, script data supplied to an OS, or the like.

The storage medium for supplying the program may be, for example, a flexible disk, a hard disk, an optical disk, a magneto-optical disk, a CD-ROM, a CD-R, a CD-RW, a magnetic tape, a non-volatile memory card, a ROM, or a DVD.

In this case, the functions of the embodiment described above are implemented by the program code read from the storage medium, so that the storage medium storing the program code falls within the scope of the present invention.

Alternatively, the program may be obtained by connecting to a Web page on the Internet using a browser of a client computer and downloading the program itself from the Web page to a storage medium such as a hard disk. Yet alternatively, the program may be obtained by downloading a compressed file including an automatic installation function from the Web page to a storage medium such as a hard disk. Furthermore, program code of the program may be divided into a plurality of files and provided in different Web pages so that the individual files can be downloaded from the Web pages. That is, a WWW server, an FTP server, or the like that allows a plurality of users to download program files for implementing processing functions according to the present invention by a computer also falls within the scope of the present invention.

Furthermore, the program may be encrypted when the program is stored in a storage medium such as a CD-ROM and distributed to a user. In this case, a user satisfying a certain condition is allowed to download key information for decryption from a Web page via the Internet. The user can decrypt the encrypted program using the key information and install the program on a computer.

Instead of achieving the functions of the embodiment through execution of the program code by a computer, an OS (Operating System) running on the computer may execute part of or the entire processing according to instructions in the program code, thereby achieving the functions of the embodiment. This also falls within the scope of the present invention.

Furthermore, the program code read from the storage medium may be written to a memory of a function expansion board mounted on the computer or a function expansion unit connected to the computer so that a CPU or the like of the function expansion board or the function expansion unit can execute part of or the entire processing according to the program code, thereby achieving the functions of the embodiment. This also falls within the scope of the present invention.

Furthermore, the present invention can be applied to a system including a plurality of devices or to an independent device. Furthermore, the present invention may be implemented by supplying a program to a system or device. In this case, by allowing the system or device to read the program constituting software for implementing the present invention from a storage medium storing the program, the system or device can achieve advantages of the present invention.

The present invention is not limited to the embodiments described above, and various modifications (including combinations of embodiments) can be made without departing from the spirit of the present invention. Such modifications are not excluded from the scope of the present invention.

Although various embodiments of the present invention have been described above, it will be understood by those skilled in the art that the scope of the present invention is not limited to the specific descriptions in this specification.

It will also be understood that combinations of modifications of the embodiments described above fall within the scope of the present invention.

As described above, according to the embodiment, advantageously, it is possible to provide a data processing device (e.g., the data encryption device 102) that is connected between a storage device (e.g., the HDD 103) and a controlling device (e.g., the HDD controller 101) for controlling the storage device and that appropriately maintains security of data transferred between the storage device and the controlling device.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

What is claimed is:

1. A data processing device for connection between a storage device and a controlling device, the data processing device comprising:

an encryption unit configured to encrypt data which is received from the controlling device and is to be transmitted to the storage device;

a decryption unit configured to decrypt data which is encrypted, is received from the storage device and is to be transmitted to the controlling device;

a receiving unit configured to receive commands including a first command for reading data which is encrypted by the encryption unit and is stored in the storage device and a second command for reading data which is not encrypted by the encryption unit and is stored in the storage device from the controlling device;

a storing unit configured to store reference data for determining whether a command is to be transmitted to the storage device;

a determining unit configured to determine whether to transmit a command received by the receiving unit to the storage device, based on the reference data stored in the storing unit;

a transmitting unit configured to transmit to the storage device the command determined to be transmitted to the storage device, wherein the transmitting unit does not transmit to the storage device the command which is not determined to be transmitted to the storage device; and a controlling unit configured to, when the command which is determined to be transmitted and is transmitted to the storage device is the first command, control the decryption unit to perform a decryption process on the data which is encrypted and is received from the storage device, wherein, when the command which is determined to be transmitted and is transmitted to the storage device is the second command, the controlling unit does not control the decryption unit to perform the decryption process on the data which is not encrypted and is received from the storage device.

2. A data processing device according to claim 1, wherein the second command is a command for reading at least one of a number of cylinders of the storage device, a number of heads of the storage device and a serial number of the storage device from the storage device.

3. A data processing device according to claim 1, further comprising a seed information storing unit configured to store seed information for generating key information that is used for the encryption and the decryption, wherein the encryption unit is arranged to encrypt data using key information generated on the basis of the seed information stored in the seed information storing unit and unique information from the controlling device and the decryption unit is arranged to decrypt data using key information generated on the basis of the seed information stored in the seed information storing unit and unique information from the controlling device.

4. A data processing device according to claim 3, further comprising a key generating unit configured to generate the key information and store the key information in the storing unit, the key information being generated each time the data processing device is activated, based on the seed information stored in the storing unit and the unique information from the controlling device.

5. A data processing device according to claim 1, wherein the data processing device is connected between the controlling device and the storage device.

6. A data processing device according to claim 1, wherein the reference data specifies commands which are transmitted to the storage device.

7. A data processing device according to claim 1, wherein the receiving unit is configured to receive data and a third command for writing the data in the storage device from the controlling device, the encryption unit is configured to encrypt the received data, and the transmitting unit is configured to transmit to the storage device the encrypted data and the third command determined to be transmitted to the storage device.

8. A data processing device according to claim 1, further comprising:

a bypass unit configured to bypass the decryption unit, wherein when the command is the second command, the controlling unit causes the data which is received from the storage device to pass via the bypass unit.

9. A data processing device according to claim 8, further comprising:

a selector configured to transmit the data which is received from the storage device to the decryption unit or the bypass unit, wherein when the command is the first command, the controlling unit causes the selector to transmit the data which is received from the storage device to the decryption unit, and wherein when the command is the second command, the controlling unit causes the selector to transmit the data which is received from the storage device to the bypass unit.

10. A data processing method for a data processing device connected between a storage device and a controlling device, the data processing method comprising:

encrypting data which is received from the controlling device and is to be transmitted to the storage device;

receiving commands including a first command for reading data which is encrypted and is stored in the storage device and a second command for reading data which is not encrypted and is stored in the storage device from the controlling device;

determining whether to transmit a received command to the storage device, based on reference data for determining whether a command is to be transmitted to the storage device;

transmitting to the storage device the command determined to be transmitted to the storage device, wherein the command which is not determined to be transmitted to the storage device is not transmitted to the storage device; and performing, when the command which is determined to be transmitted and is transmitted to the storage device is the first command, a decryption process on the data which is encrypted and is received from the storage device, wherein, when the command which is determined to be transmitted and is transmitted to the storage device is the second command, the decryption process is not performed on the data which is not encrypted and is received from the storage device.

11. A data processing method according to claim 10, wherein the second command is a command for reading at least one of a number of cylinders of the storage device, a number of heads of the storage device and a serial number of the storage device from the storage device.

12. A data processing method according to claim 10, wherein the data processing apparatus comprises a memory unit configured to store information for specifying whether a command is to be transmitted to the storage device, and it is determined, based on the information, whether to transmit the received command to the storage device.

* * * * *